US012017295B2

(12) United States Patent
Nadler et al.

(10) Patent No.: US 12,017,295 B2
(45) Date of Patent: Jun. 25, 2024

(54) TORCH WITH ADJUSTABLE FEATURES

(71) Applicant: The ESAB Group Inc., Annapolis Junction, MD (US)

(72) Inventors: Michael Nadler, Wilmot, NH (US); Douglas Smith, Florence, SC (US); Kevin Horner-Richardson, Cornish, NH (US); Auston Maynard, East Thetford, VT (US)

(73) Assignee: THE ESAB GROUP INC., North Bethesda, MD (US)

( * ) Notice: Subject to any disclaimer, the term of this patent is extended or adjusted under 35 U.S.C. 154(b) by 181 days.

(21) Appl. No.: 17/665,701

(22) Filed: Feb. 7, 2022

(65) Prior Publication Data
US 2022/0250186 A1 Aug. 11, 2022

Related U.S. Application Data

(60) Provisional application No. 63/149,463, filed on Feb. 15, 2021, provisional application No. 63/147,874, filed on Feb. 10, 2021.

(51) Int. Cl.
*B23K 10/02* (2006.01)
*H05H 1/34* (2006.01)

(52) U.S. Cl.
CPC ............... *B23K 10/02* (2013.01); *H05H 1/34* (2013.01)

(58) Field of Classification Search
None
See application file for complete search history.

(56) References Cited

U.S. PATENT DOCUMENTS 3,012,131 A 12/1961 Forney
3,909,585 A 9/1975 Sanders et al.
(Continued)

FOREIGN PATENT DOCUMENTS

CN 201380371 Y 1/2010
CN 205129131 U 4/2016
(Continued)

OTHER PUBLICATIONS

Translation of JP-3591182-B2 (Year: 2004).*
(Continued)

*Primary Examiner* — Elizabeth M Kerr
(74) *Attorney, Agent, or Firm* — Edell, Shapiro & Finnan, LLC

(57) ABSTRACT

A torch having first and second housing portions may contain multiple adjustment features such as an adjustable length, an adjustable pivot angle of the second housing portion, and an adjustable rotational angle of the second housing portion. The second housing portion may be both slidably and rotationally coupled to the first housing portion. The second housing portion may be configured to slide along a longitudinal axis of the torch to adjust a length of the torch. The second housing portion may be further configured to rotate about the longitudinal axis of the torch to adjust the rotational orientation of the second housing portion with respect to the first housing portion. At least a section of the second housing portion may be configured to pivot about a transverse axis with respect to the first housing portion, the transverse axis being transverse to the longitudinal axis of the torch.

20 Claims, 29 Drawing Sheets

(56) References Cited

U.S. PATENT DOCUMENTS

| | | | |
|---|---|---|---|
| 4,018,973 A | 4/1977 | Paton et al. | |
| 4,118,620 A | 10/1978 | Wall, Jr. et al. | |
| 4,227,066 A | 10/1980 | Bulwidas, Jr. | |
| 4,268,740 A | 5/1981 | Sanders | |
| 4,361,747 A | 11/1982 | Torrani | |
| 4,580,032 A * | 4/1986 | Carkhuff | H05H 1/34 219/121.57 |
| 5,132,513 A | 7/1992 | Ingwersen et al. | |
| 5,338,917 A | 8/1994 | Stuart et al. | |
| 5,440,100 A | 8/1995 | Stuart et al. | |
| 5,491,321 A | 2/1996 | Stuart et al. | |
| 5,558,268 A | 9/1996 | Acheson | |
| 5,916,465 A | 6/1999 | New et al. | |
| 5,958,262 A | 9/1999 | Palko et al. | |
| 6,010,329 A | 1/2000 | Zagoroff | |
| 6,095,801 A | 8/2000 | Spiewak | |
| 6,227,846 B1 | 5/2001 | Zagoroff | |
| 6,284,995 B1 | 9/2001 | Esslinger et al. | |
| 6,512,194 B1 | 1/2003 | Koshurba et al. | |
| 7,196,284 B2 | 3/2007 | Barten | |
| 7,342,199 B2 | 3/2008 | Zamuner | |
| 7,446,280 B2 | 11/2008 | Zamuner | |
| 8,134,097 B2 | 3/2012 | Schneider | |
| 8,373,094 B2 | 2/2013 | Wells et al. | |
| 8,614,404 B2 | 12/2013 | Twarog et al. | |
| 8,963,046 B2 | 2/2015 | Wells et al. | |
| 9,199,329 B2 | 12/2015 | Kettunen | |
| 9,480,138 B2 | 10/2016 | Hansen et al. | |
| 9,486,874 B2 | 11/2016 | Giese | |
| 9,770,832 B2 | 9/2017 | Cosette et al. | |
| 10,710,190 B2 | 7/2020 | Gagnon | |
| 2007/0007264 A1 | 1/2007 | Zamuner | |
| 2009/0039059 A1 * | 2/2009 | Twarog | H05H 1/3423 219/121.48 |
| 2010/0096374 A1 | 4/2010 | Karpoff et al. | |
| 2013/0184097 A1 * | 7/2013 | Cameron | A63B 60/22 473/296 |
| 2014/0138360 A1 | 5/2014 | Hansen et al. | |
| 2014/0166626 A1 | 6/2014 | Lizotte et al. | |
| 2015/0007612 A1 | 3/2015 | Pagano et al. | |
| 2015/0069039 A1 | 3/2015 | Lutgenau | |
| 2017/0182582 A1 | 6/2017 | Daniels et al. | |
| 2017/0188445 A1 * | 6/2017 | Yamaguchi | B23K 10/00 |
| 2017/0342338 A1 | 11/2017 | McKenna et al. | |
| 2018/0116043 A1 | 4/2018 | Roberts et al. | |

FOREIGN PATENT DOCUMENTS

| | | |
|---|---|---|
| CN | 103737163 B | 6/2016 |
| CN | 106964868 A | 7/2017 |
| CN | 208841866 U | 5/2019 |
| EP | 3334257 A1 | 6/2018 |
| JP | 10180450 A | 7/1998 |
| JP | 3591182 B2 * | 11/2004 |
| JP | 3591182 B2 | 11/2004 |
| KR | 102030579 B1 | 10/2019 |
| WO | 2008092953 A1 | 8/2008 |
| WO | 2009021024 A2 | 2/2009 |

OTHER PUBLICATIONS

Notification of Transmittal of International Search Report and Written Opinion including International Search Report and Written Opinion for International Application No. PCT/US2022/015406 dated May 6, 2022, 16 pages.

* cited by examiner

TORCH WITH ADJUSTABLE FEATURES

CROSS-REFERENCE TO RELATED APPLICATIONS

This application claims priority under 35 U.S.C. 119(e) to U.S. Provisional Patent Application Ser. No. 63/147,874, entitled "TELESCOPING TORCH", filed Feb. 10, 2021, and U.S. Provisional Patent Application Ser. No. 63/149,463, entitled "TORCH WITH ADJUSTABLE FEATURES", filed Feb. 15, 2021. The disclosures of both identified applications being incorporated herein by reference in their entirety for all purposes.

TECHNICAL FIELD

The present disclosure is directed toward welding and/or cutting torches and, in particular, to welding and/or cutting torches with multiple adjustment features.

BACKGROUND OF THE INVENTION

Current welding and plasma torches have a set length, and that length is typically not adjustable. Every torch length offers specific trade-offs to the user of the torch as there are advantages to both longer torches and shorter torches. For example, a longer torch may provide at least the following advantages: better visibility of the torch tip; better manual control due to the responsiveness of the torch resulting from a longer moment arm from the user's hands; improved reach; improved safety (i.e., by keeping a user's hands further from the heat and slag), etc. A shorter torch may provide at least the following advantages: better maneuverability in tight spaces/corners; improved portability; improved durability; is easier to keep steady, etc. However, users may require different torches of different lengths depending on a specific task that must be completed. This may result in a user having to switch torches in the middle of a single job as the performance needs and desires of the torch change. Because torches of different lengths may be required for a particular job or a particular task, the need to transport multiple torches of varying lengths results in added cost and space requirements.

Similarly, in order to accommodate a variety of positions, currently marketed torches are sold with discreet torch handle to torch head angles. For example, the handle to head angle may be 90 degrees for a drag cutting application, or could be 0 degrees (i.e., coaxial) for mechanized cutting. As such, a user will purchase a torch handle which most closely fits their needs, and may need to stock a variety of handles for use with differing job requirements. Furthermore, a fixed angle will require the torch handle to be steered so as to position the torch cutting tip correctly to achieve the desired cut or welding path and angles. This can be particularly difficult given the rigidity and mass of the cable assembly connected to the rear of the torch handle.

Thus, adjustable torches are desired so that a user can continue a particular cutting or welding operation without having to change between multiple torches. It would be desirable for both the length of the torch to be adjustable, and for the torch head to torch handle angle to be adjustable. It would further be desirable to be able to rotate, about a longitudinal axis of the torch, the torch head with respect to the torch handle. These multiple degrees of adjustment/ degrees of movement enable a user to adjust the torch to position the torch tip in a desired position for a cutting or welding operation. Additionally, torches having multiple adjustment mechanisms may provide both costs and space requirement savings for users since multiple torches will not be required to complete a job. Torches having an adjustable length may also be desirable for the ergonomics (i.e., each user may prefer a torch of different lengths and different angles regardless of the specific job or task that needs to be completed) they provide.

SUMMARY OF THE INVENTION

The present disclosure is directed towards welding/cutting torches that have features that enable multiple degrees of adjustment. The multiple features of the torch may enable the position/orientation of the torch head to be reconfigurable/adjustable with respect to the torch handle through a variety of different mechanisms.

In one degree of adjustment, the torch head may be able to telescope or axially extend with respect to the torch handle along a central longitudinal axis that extends centrally along the length of the torch such that the length of the torch is reconfigurable between at least an expanded configuration and a collapsed configuration. Thus, the length of the torch may be adjusted to a desired length for a specific use or application. In some embodiments, the length of the torch may be capable of being set to any number of positions (i.e., lengths) between a fully expanded configuration, where the torch is at its longest length, and a fully collapsed configuration, where the torch is at its shorted length.

In another degree of adjustment, the torch head may be able to pivot with respect to the torch handle. In some embodiments, the torch head may be configured to pivot about an axis that is transverse or tangential to the central longitudinal axis of the torch. Thus, the torch head may be configured to pivot between an aligned position, where the end of the torch head (i.e., the end of the consumable) is aligned with the central axis, and an offset position, where the torch head is pivoted to a position such that the end of the torch head (i.e., the end of the consumable assembly or torch tip) is angularly offset from the central longitudinal axis.

In at least a third degree of movement, the torch head may be able to rotate with respect to the torch handle, and, specifically, about the central longitudinal axis. If the torch head has been pivoted, that rotational degree of movement enables the end of the torch head (i.e., the end of the consumable assembly or torch tip) to be oriented along a particular side/portion of the torch handle. For example, if the torch head has been pivoted to be offset approximately 90 degrees from the central longitudinal axis, the torch head may then be rotated about the central longitudinal axis such that the torch tip is disposed proximate to the trigger side of the torch handle, rotated such that the torch tip is disposed proximate to the side of the handle that is opposite the trigger side, or rotated to any other position therebetween.

According to one embodiment, a plasma arc torch presented herein may include a first torch housing portion and a second torch housing portion. The second torch housing portion may be movably coupled to the first torch housing portion. In a first movement, the second torch housing portion may be configured to slide along a longitudinal axis of the plasma arc torch to adjust a length of the plasma arc torch. In a second movement, the second torch housing portion may be configured to rotate about the longitudinal axis of the plasma arc torch with respect to the first torch housing portion.

In at least some instances, the second torch housing portion may include at least a torch head segment and a neck segment. The neck segment may include an exterior surface, and may be at least partially disposed within an interior cavity of the first torch housing portion. In some further instances, an end of the first torch housing portion may include a series of annular tabs that surround at least a portion of the exterior surface of the neck segment. In some even further instances, a lock ring may be threaded onto the series of annular tabs. The lock ring may be configured to cause the series of annular tabs to impart a clamping force onto the exterior surface of the neck segment based on rotation of the lock ring with respect to the series of annular tabs.

In other instances, a torch lead may be coupled to the neck segment of the second torch housing portion and may be at least partially disposed within an interior cavity of the first torch housing portion. As the length of the plasma arc torch is increased, the first torch housing portion may slides along the torch lead.

According to another embodiment, a plasma arc torch presented herein may include a first torch housing portion and a second torch housing portion. The second torch housing portion may be movably coupled to the first torch housing portion. In a first movement, the second torch housing portion may be configured to slide along a longitudinal axis of the plasma arc torch to adjust a length of the plasma arc torch. In a second movement, at least a segment of the second torch housing portion may be configured to rotate about a transverse axis of the plasma arc torch with respect to the first torch housing portion where the transverse axis may be transverse to the longitudinal axis.

In some instances, the second torch housing portion may include at least a neck segment, an intermediate segment, and a torch head segment. In some further instances, the neck segment may include an exterior surface and may be at least partially disposed within an interior cavity of the first torch housing portion. Moreover, in even some further instances, an end of the first torch housing portion may include a series of annular tabs that surround at least a portion of the exterior surface of the neck segment. In some additional instances, a lock ring may be threaded onto the series of annular tabs and configured to cause the series of annular tabs to impart a clamping force onto the exterior surface of the neck segment based on rotation of the lock ring with respect to the series of annular tabs.

Additionally, in some instances, the torch head segment may be configured to removably receive a consumable assembly, while the intermediate segment may include a projection configured to be used as an impact device for striking objects or a work surface. In some even further instances, the torch head segment may be configured to rotate about the transverse axis between an aligned position and an offset position. In the aligned position, the torch head segment may extend from the intermediate segment along the longitudinal axis of the plasma arc torch. In the offset position, the torch head segment may be offset from the longitudinal axis of the plasma arc torch. When rotated to the offset position, the consumable assembly may be rotated away from the projection of the intermediate segment.

According to yet another embodiment, the plasma arc torch presented herein may include a first torch housing portion and a second torch housing portion. The second torch housing portion may be movably coupled to the first torch housing portion. In a first movement, the second torch housing portion may be configured to rotate about a longitudinal axis of the plasma arc torch with respect to the first torch housing portion. In a second movement, at least a segment of the second torch housing portion may be configured to rotate about a transverse axis of the plasma arc torch with respect to the first torch housing portion where the transverse axis may be transverse to the longitudinal axis.

In some instances, the second torch housing portion may include at least a neck segment, an intermediate segment, and a torch head segment. In some further instances, the neck segment may include an exterior surface and may be at least partially disposed within an interior cavity of the first torch housing portion. In some even further instances, an end of the first torch housing portion may include a series of annular tabs that surround at least a portion of the exterior surface of the neck segment. Moreover, a lock ring may be threaded onto the series of annular tabs and may be configured to cause the series of annular tabs to impart a clamping force onto the exterior surface of the neck segment based on rotation of the lock ring with respect to the series of annular tabs.

Additionally, in some instances, the torch head segment may be configured to removably receive a consumable assembly, while the intermediate segment may include a projection configured to be used as an impact device for striking objects or a work surface. In some further instances, the torch head segment may be configured to rotate about the transverse axis between an aligned position and an offset position. In the aligned position, the torch head segment may extend from the intermediate segment along the longitudinal axis of the plasma arc torch. In the offset position, the torch head segment may be offset from the longitudinal axis of the plasma arc torch. When rotated to the offset position, the consumable assembly may be rotated away from the projection of the intermediate segment.

Other systems, methods, features and advantages will be, or will become, apparent to one with skill in the art upon examination of the following figures and detailed description. All such additional systems, methods, features and advantages are included within this description, are within the scope of the claimed subject matter.

BRIEF DESCRIPTION OF THE DRAWINGS

The torches presented herein may be better understood with reference to the following drawings and description. It should be understood that the elements in the figures are not necessarily to scale and that emphasis has been placed upon illustrating the principles of the torches. In the figures, like-referenced numerals designate corresponding parts throughout the different views.

DETAILED DESCRIPTION OF THE INVENTION

Figure 1A:
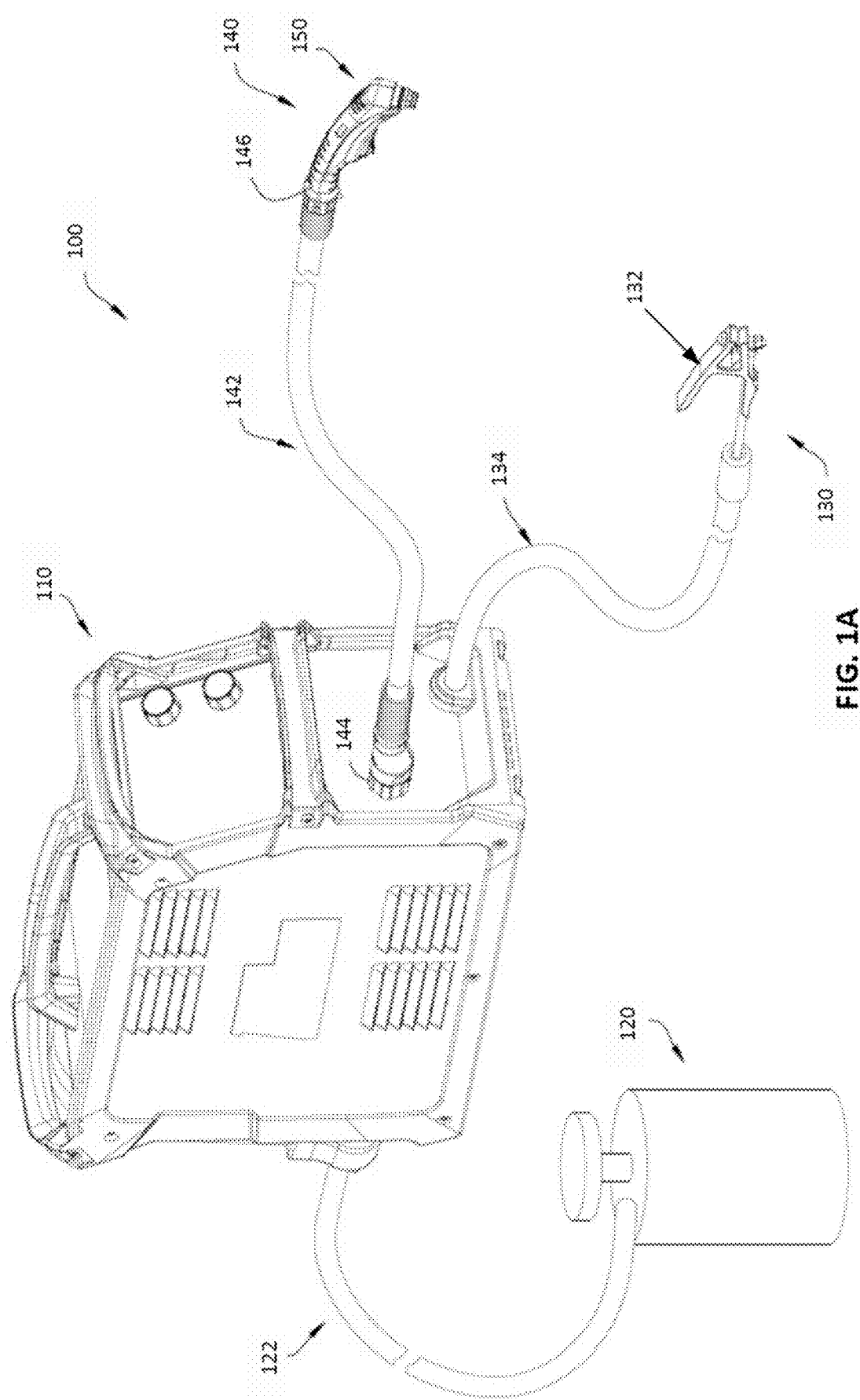
FIG. 1A is a perspective view of a manual cutting system including a power source and torch assembly with which the torches presented herein may be utilized, according to an example embodiment of the present disclosure.

The present invention is directed to a torch that has multiple degrees of adjustment. More specifically, the length of the torch may be adjusted, and the torch head portion may be pivoted and/or rotated with respect to the handle of the torch. As disclosed herein, the torch may include a first torch portion/housing (i.e., a torch head housing) and a second torch portion/housing (torch handle housing). The first torch portion may include a torch head portion and a neck portion. The torch head portion may be configured to receive and retain a consumable assembly, while the neck portion may be an elongated structure having a first end and an opposite second end coupled to the torch head portion. At least a portion of the neck portion, including the first end of the neck portion, may be slidably received within an interior cavity of the second torch portion such that the first end of the neck portion of the first torch portion slides through the interior cavity of the second torch portion. The first torch portion may telescope along a central longitudinal axis of the torch with respect to the second torch portion between a collapsed position, where the torch head portion of the first torch portion is disposed proximate to the second torch portion, and an extended position, where the torch head portion of the first torch portion is spaced from the second torch portion. When in the collapsed position, the torch has its shortest length, and when in the extended position, the torch has its longest length. The torch may further be adjusted to any number of intermediate lengths between the shortest and longest lengths.

In some embodiments, at least a portion of the torch head portion is configured to pivot with respect to the other portions of the torch. The torch head portion may be configured to pivot about a transverse axis of the torch (i.e., an axis that is substantially perpendicular to the central longitudinal axis). In addition, the first torch portion, including the torch head portion, may be configured to rotate about the central longitudinal axis with respect to the second torch portion regardless of whether or not the torch head portion has been pivoted about the transverse axis.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

FIG. 1A illustrates an example embodiment of a manual cutting system 100 that may utilize the plasma arc torch embodiment presented herein. At a high-level, the manual cutting system 100 may include a power supply 110 and a torch assembly 140. The power supply 110 may be configured to supply (or at least control the supply of) power and gas to a torch 150 included in the torch assembly 140 via torch lead 142 (also referred to as cable hose 142). For example, the power supply 110 may meter a flow of gas received from a gas supply 120, which the power supply 110 receives via cable hose 122, before or as the power supply 110 supplies gas to the torch 150 via cable hose 142.

The manual cutting system 100 may also include a working lead assembly 130 with a grounding clamp 132 that is connected to the power supply by a work lead 134 (also referred to as cable hose 134). As illustrated, cable hose 122, cable hose 134, and cable hose 142 may each be any length. Moreover, each end of cable hose 122, cable hose 134, and cable hose 142 may be connected to components of the manual cutting system 100 via any connectors now known or developed hereafter (e.g., via releasable connectors). For example, torch 150 may be connected to a distal end of cable hose 142 via a quick disconnect connector 146 and power supply 110 may be connected to a proximal end of cable hose 142 via a quick disconnect connector 144.

Figure 1B:
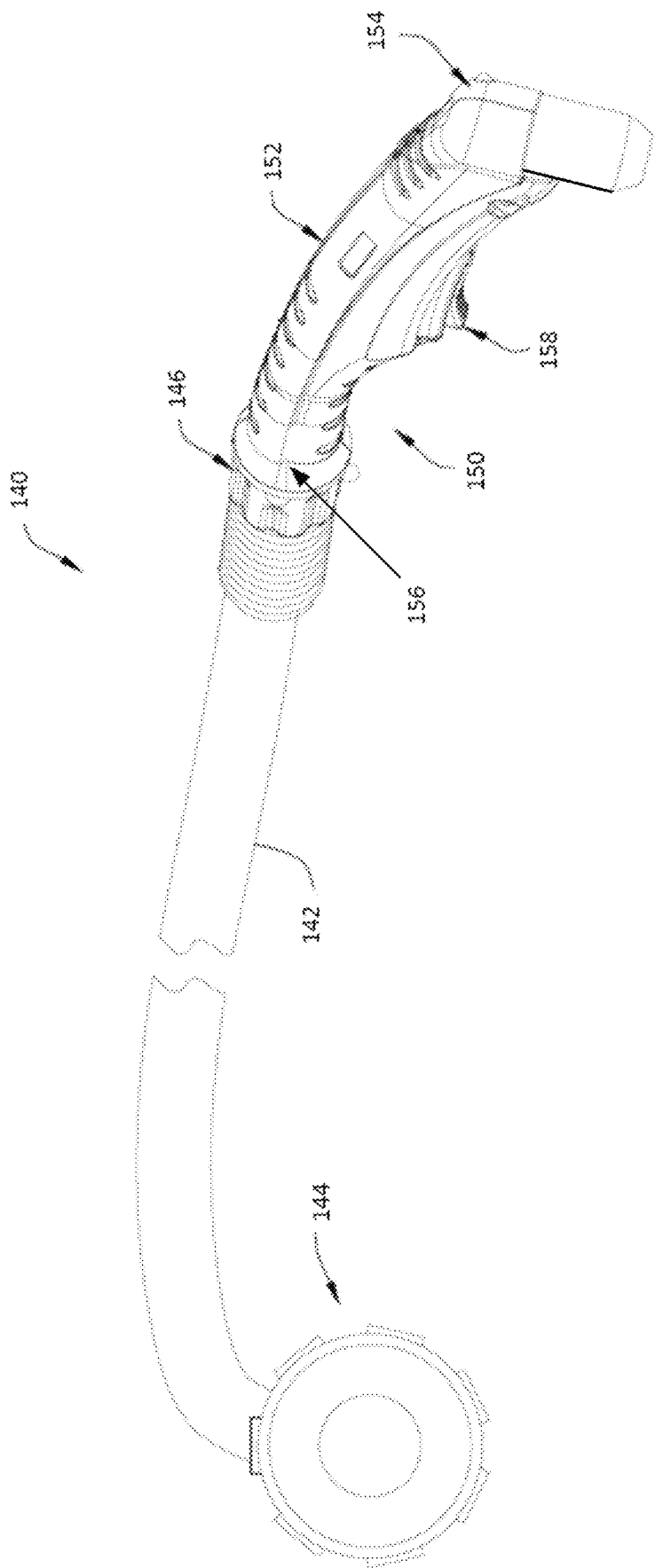
FIG. 1B is a perspective of the torch assembly of FIG. 1A.
Figure 2A:
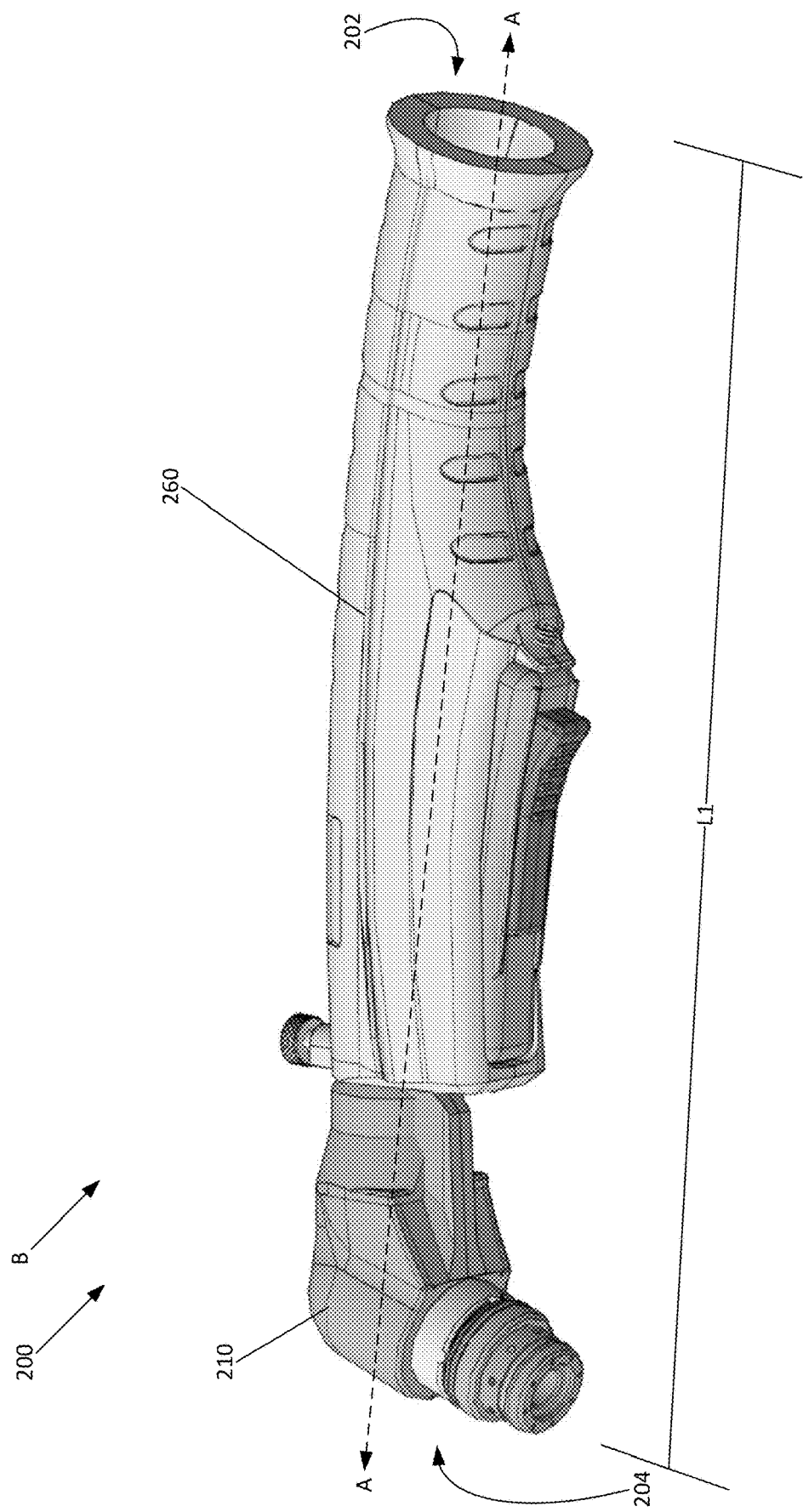
FIG. 2A is a perspective view of a first example embodiment of a telescoping torch according to the present disclosure, where the torch is in the fully collapsed configuration.
Figure 2B:
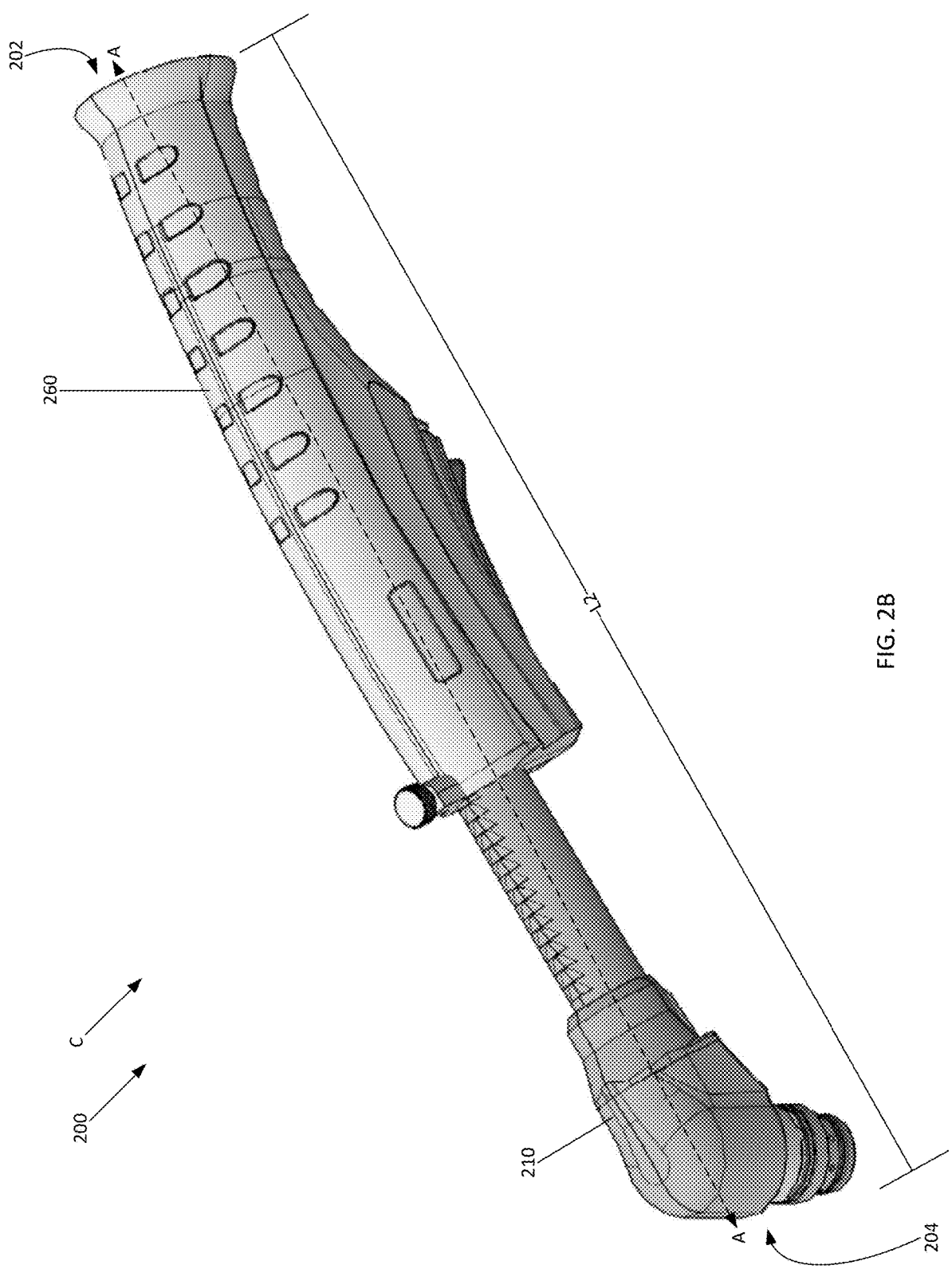
FIG. 2B is a perspective view of the first example embodiment of the telescoping torch illustrated in FIG. 2A, where the torch is in the fully expanded configuration.

FIG. 1B illustrates the torch assembly 140 of FIG. 1A isolated from the power supply 110. As can be seen, the torch 150 includes a torch body 152 that extends from a first end 156 (e.g., a connection end 156) to a second end 154 (e.g., an operating or operative end 154). The torch body 152 may also include a trigger 158 that allows a user to initiate cutting operations in any manner now known or developed hereafter (e.g., in a 2T or 4T mode). As mentioned above, the connection end 156 of the torch body 152 may be coupled (in any manner now known or developed hereafter) to one end of lead 142. Meanwhile, the operative end 154 of the torch body 152 may receive interchangeable components, such as consumable components that facilitate cutting operations.

Turning to FIGS. 2A, 2B, 3, 4A, 4B, 5A, and 5B, illustrated is a first embodiment of a telescoping torch 200. The torch 200 may include a first end 202 (e.g., the connection end) and an opposite second end 204 (e.g., the operating end). The torch 200 may include a torch head housing 210 and a torch body housing 260. The torch head housing 210 may be disposed more proximate to the second end 204 of the torch 200 than the first end 202 of the torch 200. Furthermore, the torch body housing 260 may be disposed more proximate to the first end 202 of the torch 200 than the second end 204 of the torch 200. As explained in further detail below, the torch head housing 210 may be configured to telescope or slide along longitudinal axis A of the torch 200 between at least a collapsed position B (FIG. 2A), where the torch head housing 210 may be fully telescoped into the torch body housing 260 and the torch may have a length L1, and an expanded position C (FIG. 2B), where the torch head housing 210 may be fully telescoped out of the torch body housing 260 and the torch may have a length L2. The length L2 may be longer than the length L1. In some embodiments, the torch head housing 210 may be telescoped out of the torch body housing 260 to any number of positions between the collapsed position B and the expanded position C, where the length of the torch 200 in any of those positions is greater than the length L1 but less than the length L2.

Figure 3:
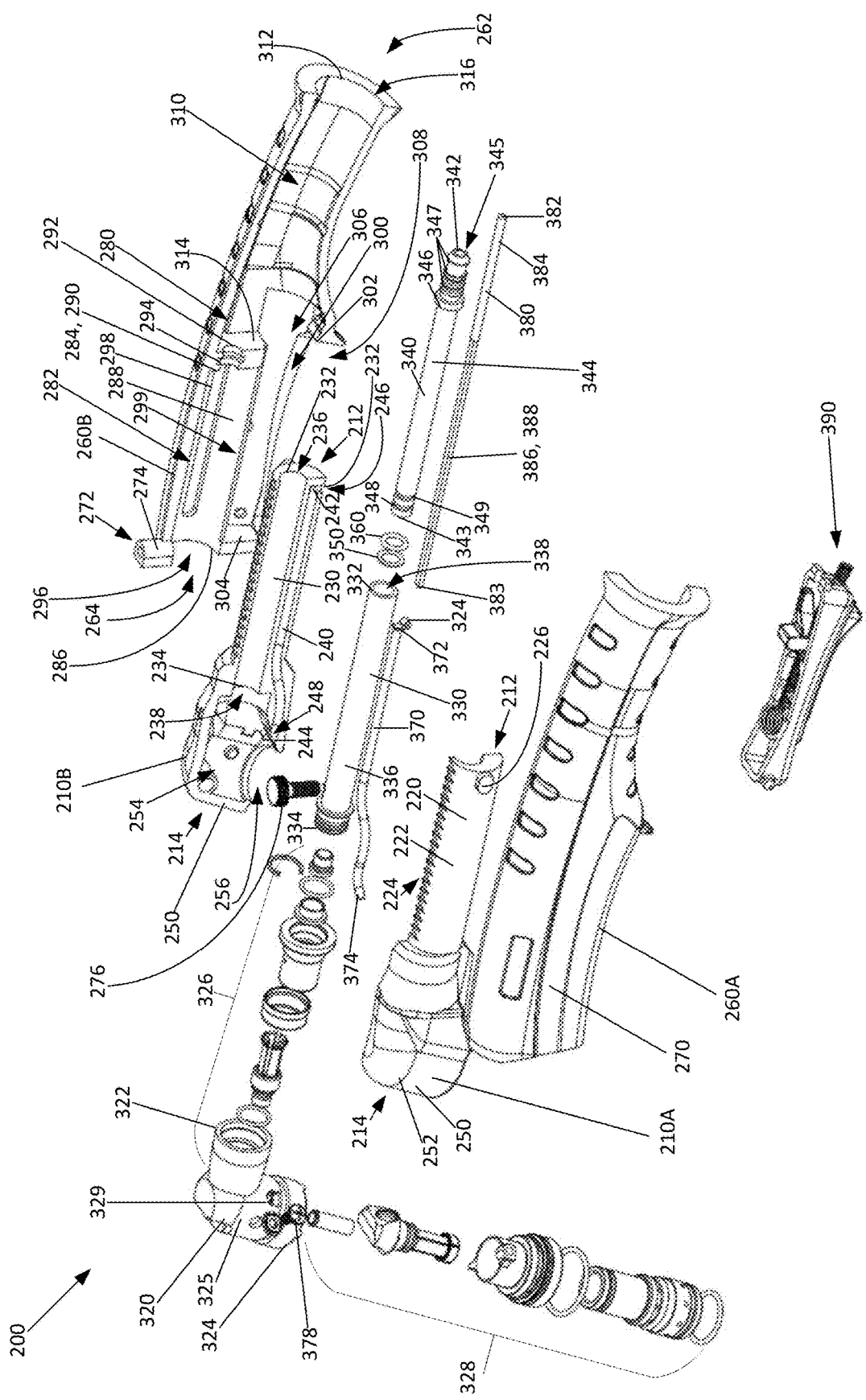
FIG. 3 is an exploded view of the first embodiment of the telescoping torch illustrated in FIG. 2A.

Turning to FIG. 3, which is an exploded view of the torch 200, as previously explained, the first embodiment of the torch 200 may include a torch head housing 210 and a torch body housing 260. FIG. 3 illustrates the torch head housing 210 split into two halves 210A, 210B for illustrative purposes only. As illustrated, the two halves 210A, 210B may be mirror images of one another. The torch head housing 210 may include a first end 212 (e.g., the connection end) and an opposite second end 214 (e.g., the operating end). The torch head housing may further include a neck portion 220 (sometimes referred to herein as neck segment), and a torch head portion 250 (sometimes referred to herein as torch head segment). In some embodiments, the neck portion 220 may be substantially cylindrical, while in other embodiments the neck portion 220 may be of any other elongated and/or prismatic shape. The neck portion 220 may be disposed more proximate to the first end 212 than the torch head portion 250. As further illustrated in FIGS. 2B and 3, the exterior surface 222 of the neck portion 220 may include a series of notches 224 that span longitudinally along the length of the neck portion 220. The notches 224 may be spaced equidistant from one another along the length of the neck portion 220. The exterior surface 222 of the neck portion may further include at least one tab 226 extending outward radially from the exterior surface 222 proximate to the first end 212 of the torch head housing 210. In the illustrated embodiment, the neck portion 220 includes a pair of tabs 226 disposed on opposing sides of the neck portion 220, while in other embodiments, the neck portion 220 may include any number of tabs 226 or no tabs 226.

As best illustrated in FIG. 3, the neck portion 220 may further include a first interior channel 230 and a second interior channel 240. The first interior channel 230 may include a first end 232 and an opposite second end 234, where the first end 232 includes a first opening 236 in the first end 212 of the torch head housing 210. The second end 234 of the first interior channel 230 may also include a second opening 238 disposed proximate to the torch head portion 250. Similarly, the second interior channel 240 may include a first end 242 and an opposite second end 244. The first end 242 of the second interior channel 240 may include a first or lower opening 246 disposed in the exterior surface 222 of the neck portion 220, where the lower opening 246 is disposed proximate to, but spaced from, the first end 212 of the torch head housing 210. Similar to the first interior channel 230, the second end 244 of the second interior channel 240 may also include a second opening 248 disposed proximate to the torch head portion 250. The first interior channel 230 may be substantially straight or linear, while the second interior channel 240 may curve through the neck portion 220. In addition, the first interior channel 230 may have a larger diameter than the second interior channel 240.

Continuing with FIG. 3, the torch head portion 250 may include an exterior surface 252 and an interior cavity 254. The interior cavity 254 may be in fluid communication with the first and second interior channels 230, 240 via the second openings 238, 248 of the first and second interior channels 230, 240, respectively. In other words, the second opening 238 of the first interior channel 230 and the second opening 248 of the second interior channel 240 may open to the interior cavity 254 of the torch head portion 250. The torch head portion 250 may further include a bottom opening 256 that provides further access to the interior cavity 254 of the torch head portion 250. As explained further below, the interior cavity 254 of the torch head portion 250 may be configured to receive and retain a torch head 320 that may be configured to receive and retain a consumable assembly 328 such that the consumable assembly 328 extends out of the interior cavity 254 via the bottom opening 256.

With further reference to FIG. 3, the torch body housing 260 is illustrated as being split into two halves 260A, 260B for illustrative purposes only. As illustrated, the two halves 260A, 260B may be mirror images of one another. The torch body housing 260 may include a first end 262 (e.g., the connection end) and an opposite second end 264 (e.g., the operating end). The torch body housing 260 may include an exterior surface 270 and may define an interior or interior cavity 280. In the embodiment illustrated, the torch 200 may include a length adjustment mechanism 272 disposed on, or formed into, the exterior surface 270 of the torch body housing 260. The length adjustment mechanism 272 may include a cylindrical portion 274 and a spring loaded pin 276 that is configured to be slidably disposed within the cylindrical portion 274. The spring loaded pin 276 may have a shank that is longer in length than the cylindrical portion 274. As further explained below, the spring loaded pin 276 may be biased by a resilient member (e.g., spring) within the cylindrical portion 274 such that a portion of the spring loaded pin 276 protrudes out of bottom side of the cylindrical portion 274 and engages one of the series of notches 224 of the neck portion 220 of the torch head housing 210 to secure the location of the torch head housing 210 in a position with respect to the torch body housing 260. The knob on the top end of the spring loaded pin 276 may allow a user to retract the spring loaded pin 276 (against the biasing force) from the notches 224 and allow movement of the torch head housing 210 with respect to the torch body housing 260.

In other embodiments, instead of the spring loaded pin 276, the torch 200 may have a screw disposed within the cylindrical portion that may have a shank that is longer in length than the cylindrical portion 274. The screw may be screwed into the top side of the cylindrical portion 274 until a portion of the screw protrudes out of bottom side of the cylindrical portion 274 such that a portion of the screw engages one of the series of notches 224 of the neck portion 220 of the torch head housing 210 to secure the location of the torch head housing 210 in a position with respect to the torch body housing 260.

The interior 280 of the torch body housing 260 may be separated into three separate cavities or regions, including, but not limited to, a conduit or cylindrical passage region 282, a lower cavity 300, and a connection end cavity 310. The conduit region 282 may be disposed within the interior 280 of the torch body housing 260 proximate to the second end 264 of the torch body housing 260. The conduit region 282 may include a first end 284 and an opposite second end 286, and may be sized and shaped to receive the neck portion 220 of the torch head housing 210. Thus, in the illustrated embodiment, the conduit region 282 may be substantially cylindrical in shape. In other embodiments, however, the conduit region 282 may be of any length or shape that mirrors that of the neck portion 220 of the torch head housing 210, such that the conduit region 282 may be configured to receive the neck portion 220 of the torch head housing 210. The conduit region 282 may further include a sidewall 288 that spans from the first end 284 to the second end 286, where the sidewall 288, first end 284, and second end 286 may define the bounds of the conduit region 282. The first end 284 of the conduit region 282 includes an end wall 290, which, in turn, may include an aperture 292 that extends through the end wall 290 and a slot centrally disposed within the end wall 290 about a portion of the aperture 292. The second end 286 of the conduit region 282 may include an opening 296. The opening 296 may be disposed in the second end 264 of the torch body housing 260, and may provide access to the conduit region 282, where the neck portion 220 of the torch head housing 210 may be inserted into the conduit region 282 via the opening 296. As explained in further detail below, as the torch head housing 210 telescopes into and out of the interior 280 of the torch body housing 260, the neck portion 220 of the torch head housing 210 slides into, out of, and through the conduit region 282 via the opening 296. As further illustrated in FIGS. 3 and 4B, the sidewalls 288 include a pair of side channels 298. Each side channel 298 of the pair of side channel 298 may span a substantial portion of the length of the conduit region 282, and may be sized and shaped to receive the tabs 226 of the neck portion 220 of the torch head housing 210. As best illustrated in FIGS. 3, 5A, and 5B, a lower longitudinal slot 299 may be disposed within the sidewalls 288, where the lower longitudinal slot 299 may span a substantial portion of the length of the conduit region 282 between the first end 284 and the second end 286.

As further illustrated in FIGS. 3, 4A, 4B, 5A, and 5B, the lower cavity 300 may be disposed within the interior 280 of the torch body housing 260 proximate to the second end 264 of the torch body housing 260, and below the conduit region 282 such that the lower longitudinal slot 299 may serve as a passageway between the conduit region 282 and the lower cavity 300. Moreover, the connection end cavity 310 may be disposed within the interior 280 of the torch body housing 260 proximate to the first end 262 of the torch body housing 260. The lower cavity 300 may include a first end 302 and an opposite second end 304, where the second end 304 may be disposed proximate to the second end 264 of the torch body housing 260. The first end 302 of the lower cavity 300 may include an opening 306 that serves as a passageway between the lower cavity 300 and the connection end cavity 310. The lower cavity 300 may further include a lower trigger opening 308 that extends through the torch body housing 260 from the exterior surface 270 of the torch body housing 260 to the interior 280. As further illustrated, the connection end cavity 310 may also include a first end 312 and an opposite second end 314. The first end 312 of the connection end cavity 310 may be disposed proximate to the first end 262 of the torch body housing 260, and the first end 312 may include an opening 316 that is also formed in the first end 262 of the torch body housing 260. The second end 314 of the connection end cavity 310 may be disposed proximate to the first end 284 of the conduit region 282 and the first end 302 of the lower cavity 300. The aperture 292 of the conduit region 282 may serve as a passageway through the end wall 290 of the first end 284 of the conduit region 282 between the conduit region 282 and the connection end cavity 310. Furthermore, as previously explained, the opening 306 of the lower cavity 300 may serve as a passageway between the lower cavity 300 and the connection end cavity 310.

Figure 5A:
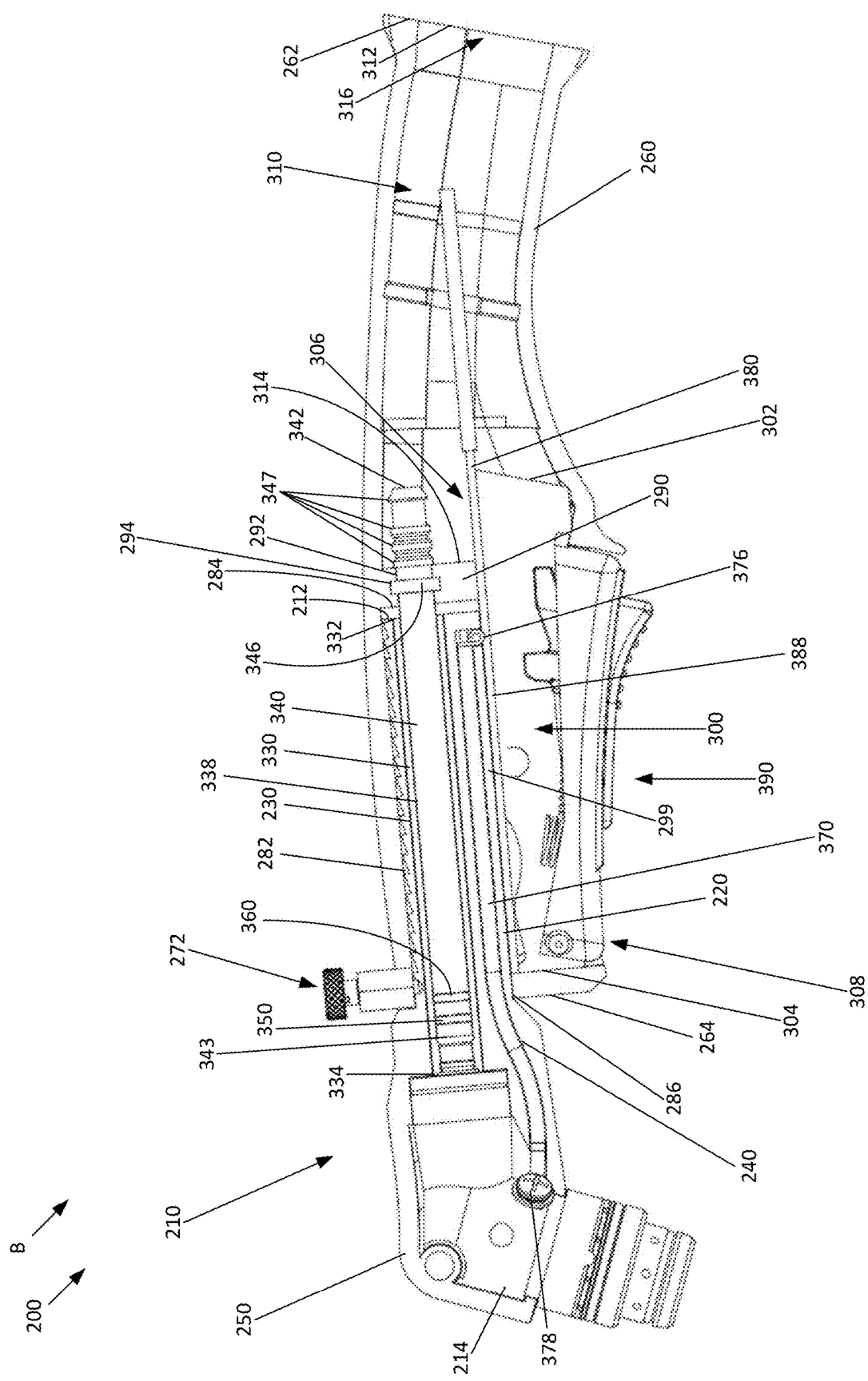
FIG. 5A is a cross-sectional view of the first example embodiment of the telescoping torch illustrated in FIG. 2A, where the telescoping torch is in the fully collapsed configuration.
Figure 5B:
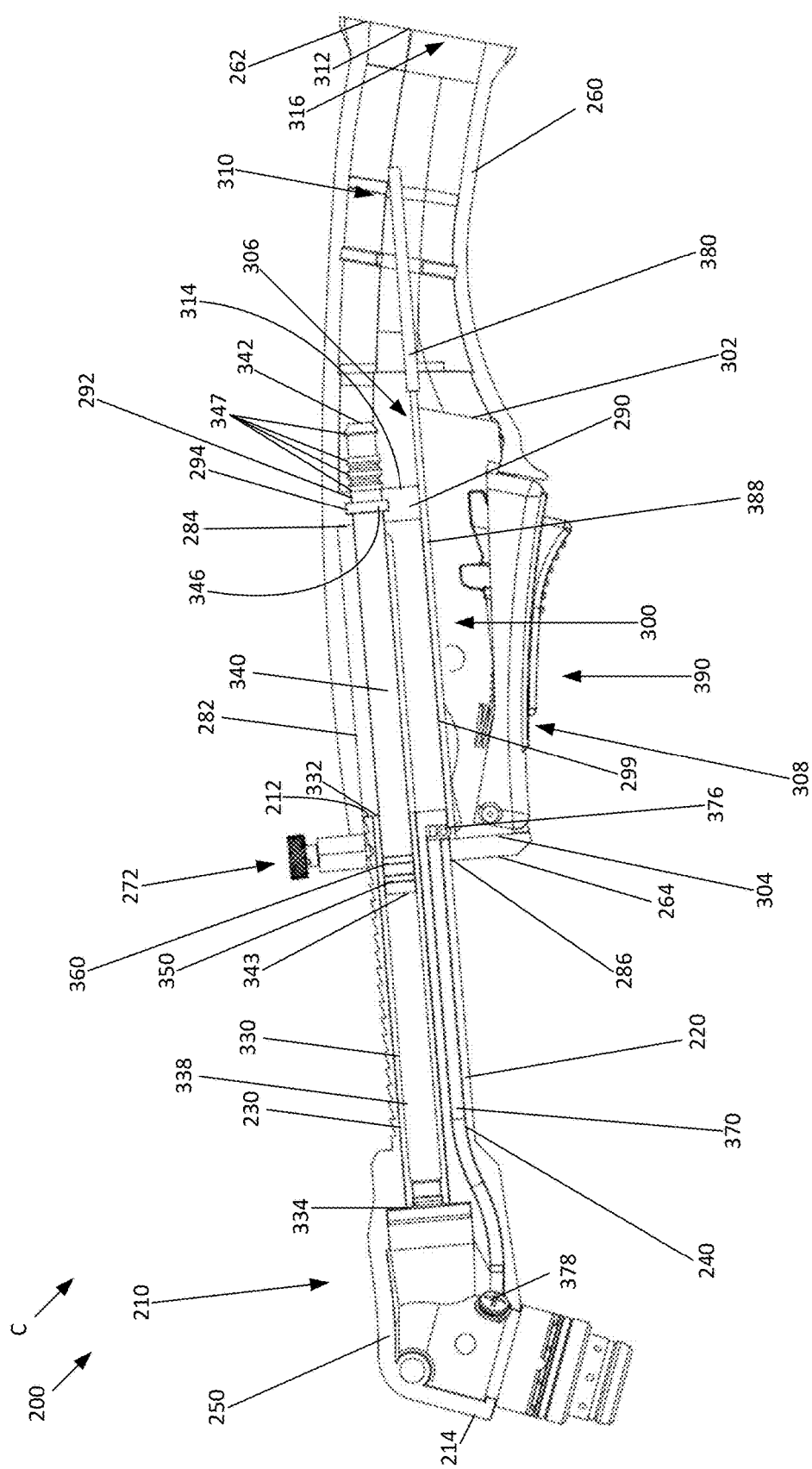
FIG. 5B is a cross-sectional view of the first example embodiment of the telescoping torch illustrated in FIG. 2A, where the telescoping torch is in the fully expanded configuration.
Figure 6A:
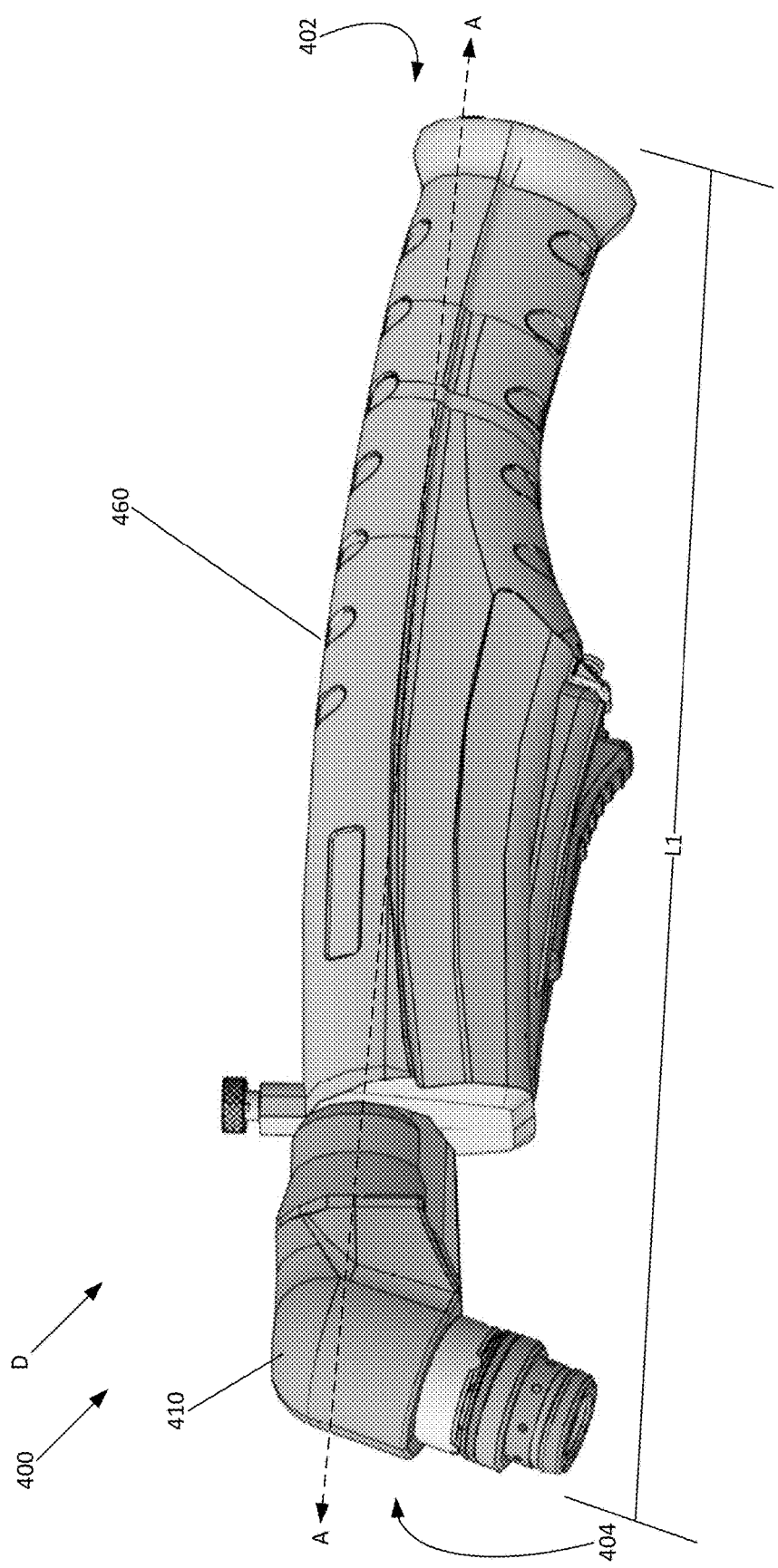
FIG. 6A is a perspective view of a second example embodiment of a telescoping torch according to the present disclosure, where the telescoping torch is in the fully collapsed configuration.
Figure 6B:
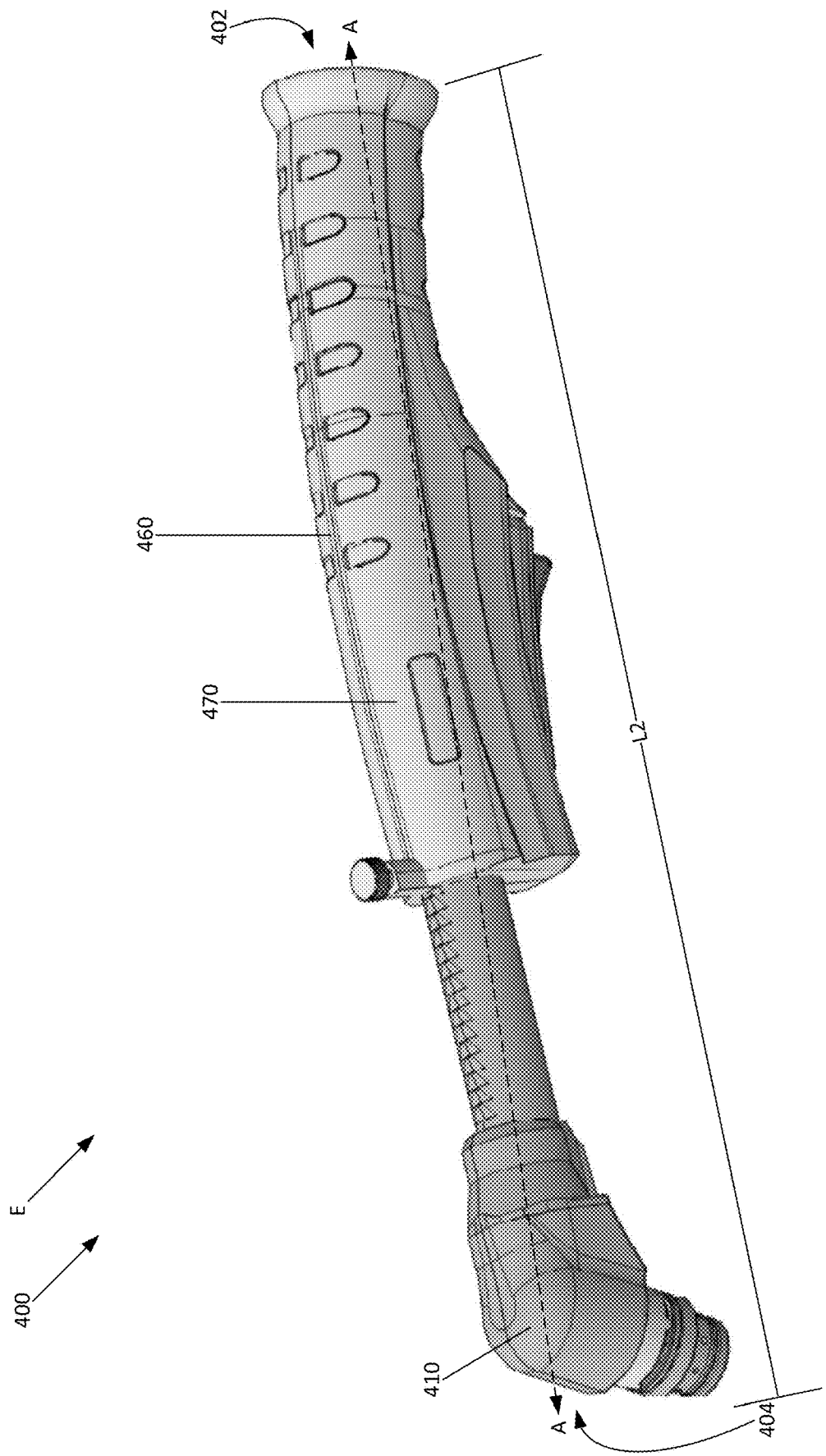
FIG. 6B is a perspective view of the second example embodiment of the telescoping torch illustrated in FIG. 6A, where the telescoping torch is in the fully expanded configuration.

With continued reference to FIGS. 3, 5A, and 5B, the torch 200 may include a torch head 320. The torch head 320 may include a first end 322 and a second end 324 opposite the first end 322. As illustrated, the torch head 320 may be substantially cylindrical. In other embodiments, however, the torch head 320 may be of any other shape. The torch head 320 may include a sidewall 325 extending between the first end 322 and the second end 324. The torch head 320 may further include a connector extension 326 extending radially from the sidewall 325 of the torch head 320 proximate to the first end 322. As further illustrated in FIGS. 3, 5A, and 5B, the second end 324 of the torch head 320 may be configured to receive and removably retain a consumable assembly 328. The torch head 320 may also include a pilot connector opening 329 disposed within the sidewall 325 at a location between the first end 322 and the second end 324 of the torch head 320. The pilot connector opening 329 may extend through the sidewall 325 to be in communication/aligned with a portion of the consumable assembly 328 when the consumable assembly 328 is disposed within the second end 324 of the torch head 320.

As further illustrated in FIGS. 3, 5A, and 5B, the torch 200 also includes a conductor tube 330 that is configured to be coupled to, and extend from, the connector extension 326 of the torch head 320. The conductor tube 330 may be an elongated cylindrical tube having a first end 332 and an opposite second end 334 coupled to the connector extension 326 of the torch head 320. The conductor tube 330 may have a sidewall 336 that extends along the length of the conductor tube 330 from the first end 332 to the second end 334. The sidewall 336 may define a central passage 338 that extends along the length of the conductor tube 330 from the first end 332 to the second end 334. In other embodiments, the conductor tube 330 may be of any other shape. The conductor tube 330 may be at least partially constructed of any material suitable for conductivity including, but not limited to, brass, copper, etc.

As illustrated in FIGS. 3, 5A, and 5B, the torch head 320 and the conductor tube 330 are configured to be disposed, housed, or located within the torch head housing 210. More specifically, the torch head 320 may be at least partially disposed within the interior cavity 254 of the torch head portion 250 of the torch head housing 210 such that the torch head 320 at least partially extends out of the bottom opening 256 of the torch head portion 250. Thus, the second end 324 of the torch head 320, along with a portion of the consumable assembly 328 when attached to the torch head 320, is disposed outside of the torch head housing 210. With the torch head 320 disposed within the interior cavity 254 of the torch head portion 250 of the torch head housing 210, the conductor tube 330 extends from the connector extension 326 through the first interior channel 230 of the neck portion 220 of the torch head housing 210. As best illustrated in FIGS. 5A and 5B, the conductor tube 330 extends through the first interior channel 230 of the neck portion 220 of the torch head housing 210 such that the first end 332 of the conductor tube 330 may be disposed proximate to, located at, or oriented in alignment with, the first end 232 of the first interior channel 230. In other words, the conductor tube 330 extends through the first interior channel 230 of the neck portion 220 of the torch head housing 210 from the first end 232 of the first interior channel 230 to the second end 234 of the first interior channel 230 such that the first end 332 of the conductor tube 330 is disposed proximate to, located at, or oriented in alignment with, the first end 212 of the torch head housing 210.

Continuing with FIGS. 3, 5A, and 5B, the torch 200 also includes a conductor extension tube 340. Similar to the conductor tube 330, the conductor extension tube 340 may be an elongated cylindrical tube having a first end 342 and an opposite second end 343. The conductor extension tube 340 may have a sidewall 344 that extends along the length of the conductor extension tube 340 from the first end 342 to the second end 343. The sidewall 344 may define a central passage 345 that extends along the length of the conductor extension tube 340 from the first end 342 to the second end 343. In other embodiments, the conductor extension tube 340 may be of any other shape. Furthermore, the conductor extension tube 340 may be at least partially constructed of any material suitable for conductivity including, but not limited to, brass, copper, etc. As further illustrated in FIGS. 3, 5A, and 5B, the conductor extension tube 340 may include a flange 346 that extends radially outward from the sidewall 344 at a location disposed between the first end 342 and the second end 343, but disposed more proximate to the first end 342 than the second end 343. The conductor extension tube 340 may also include a set of connector flanges 347 extending radially outward from the sidewall 344 proximate to the first end 342 of the conductor extension tube 340. The set of connector flanges 347 may be smaller in diameter than the flange 346, and may be configured to connect to electrical wires configured to carry current. The conductor extension tube 340 may also include a first annular depression 348 and a second annular depression 349 disposed within the sidewall 344 of the conductor extension tube 340 proximate to the second end 343 of the conductor extension tube 340. The conductor extension tube 340 may be smaller in diameter than the conductor tube 330. More specifically, the outer diameter of the conductor extension tube 340 may be less than the diameter of the central passage 338 of the conductor tube 330.

As further illustrated in FIGS. 3, 5A, and 5B, the conductor extension tube 340 may be primarily disposed within the interior 280 of the torch body housing 260. More specifically, the flange 346 of the conductor extension tube 340 may be disposed within the slot 294 around the aperture 292 of the end wall 290 between the conduit region 282 and the connection end cavity 310 of the interior 280 of the torch body housing 260. Thus, the conductor extension tube 340 is primarily disposed within the interior 280 of the torch body housing 260, where the first end 342 is disposed within the connection end cavity 310 of the interior 280 of the torch body housing 260, and where a portion of the conductor extension tube 340 extends through the conduit region 282 of the interior 280 of the torch body housing 260 such that the second end 343 of the conductor extension tube 340 extends out of the opening 296 of the second end 286 of the conduit region 282. Thus, the conductor extension tube 340 extends through the aperture 292 of the end wall 290. The disposition of the flange 346 within the slot 294 of the end wall 290 of the conduit region 282 secures the location of the conductor extension tube 340 within the interior 280 of the torch body housing 260.

As further illustrated in FIGS. 5A and 5B, an air seal gasket 350 may be disposed within the first annular depression 348 of the conductor extension tube 340, while a conductive compliant contact 360 may be disposed within the second annular depression 349 of the conductor extension tube 340. FIGS. 5A and 5B further illustrate that, with the torch head housing 210 coupled to the torch body housing 260, and specifically the neck portion 220 of the torch head housing 210 being slidably disposed within the conduit region 282 of the torch body housing 260, the second end 343 of the conductor extension tube 340, along with the air seal gasket 350 and conductive compliant contact 360, may be disposed within the central passage 338 of the conductor tube 330 via the first end 332 of the conductor tube 330. As further explained below, regardless of the position of the torch head housing 210 with regard to the torch body housing 260 (i.e., regardless of whether the torch 200 is in the collapsed position B or the expanded position C), the second end 343 of the conductor extension tube 340, the air seal gasket 350, and conductive compliant contact 360 may be disposed within the central passage 338 of the conductor tube 330.

In some embodiments, the conductive compliant contact 360 may be coupled to the conductor extension tube 340 such that the conductive compliant contact 360 is integrally built into the conductor extension tube 340. In other words, the conductive compliant contact 360 and the conductor extension tube 340 may be formed uniformly with one another (i.e., the conductive compliant contact 360 and the conductor extension tube 340 may be formed together as one singular structure rather than the conductive compliant contact 360 being a separate element attached to the conductor extension tube 340).

Continuing with FIGS. 3, 5A, and 5B, the torch 200 further includes a first pilot wire 370 and a second pilot wire 380. The first pilot wire 370 may be elongated and may include a first end 372 and an opposite second end 374. The first end 372 of the first pilot wire 370 may include a pilot return contact 376. Moreover, the second end 374 of the first pilot wire 370 may be coupled to, or disposed within, the pilot connector opening 329 of the torch head 320 via a fastener or connector 378. As further illustrated, the first pilot wire 370 may be disposed within the second interior channel 240 of the neck portion 220 of the torch head housing 210 such that the pilot return contact 376 extends out of the lower opening 246 of the first end 242 of the second interior channel 240 and downwardly from the neck portion 220 of the torch head housing 210.

The second pilot wire 380, like the first pilot wire 370, may be elongated and include a first end 382 and an opposite second end 383. The second pilot wire 380 may further be divided into a first segment 384, which is encased in a wire housing and disposed more proximate to the first end 382 than the second end 383, and a second segment 386, which includes an exposed contact portion 388 and is disposed more proximate to the second end 383 than the first end 382. As best illustrated in FIGS. 5A and 5B, the second pilot wire 380 may be disposed within the torch body housing 260 such that the second pilot wire 380 extends through both the lower cavity 300 and the connection end cavity 310, and through the opening 306 between the lower cavity 300 and the connection end cavity 310. More specifically, the first end 382 and the first segment 384 of the second pilot wire 380 may be disposed within the connection end cavity 310, while the second end 383 and the second segment 386 of the second pilot wire 380 may be disposed within the lower cavity 300 proximate to lower longitudinal slot 299 of the sidewall 288 of the conduit region 282. FIGS. 5A and 5B further illustrate that the second end 383 of the second pilot wire 380 may be disposed adjacent to, in abutment with, or proximate to the second end 304 of the lower cavity 300 (i.e., the second end 264 of the torch body housing 260). Thus, as illustrated in FIGS. 5A and 5B, with the neck portion 220 of the torch head housing 210 disposed within the conduit region 282 of the torch body housing 260, the pilot return contact 376 extends downwardly from the neck portion 220 of the torch head housing 210, through the lower longitudinal slot 299 of the sidewall 288 of the conduit region 282 of the torch body housing 260, and into contact with the exposed contact portion 388 of the second pilot wire 380 to establish an electrical pilot connection between the first pilot wire 370 and the second pilot wire 380. As further illustrated in FIGS. 5A and 5B, as the torch head housing 210 slides into and out of the torch body housing 260 the collapsed position B and the expanded position C, the pilot return contact 376 of the first pilot wire 370 slides or drags along the exposed contact portion 388 of the second pilot wire 380 to maintain the electrical connection between the first pilot wire 370 and the second pilot wire 380.

As further illustrated in FIGS. 3, 5A, and 5B, the torch 200 may also include a trigger 390 that may be at least partially disposed within the lower cavity 300 of the torch body housing 260. As illustrated, the trigger 390 may at least partially extend out of the torch body housing 260 through the lower trigger opening 308. The trigger 390 may be configured to be depressed into the torch body housing 260 to activate the torch 200.

Figure 4A:
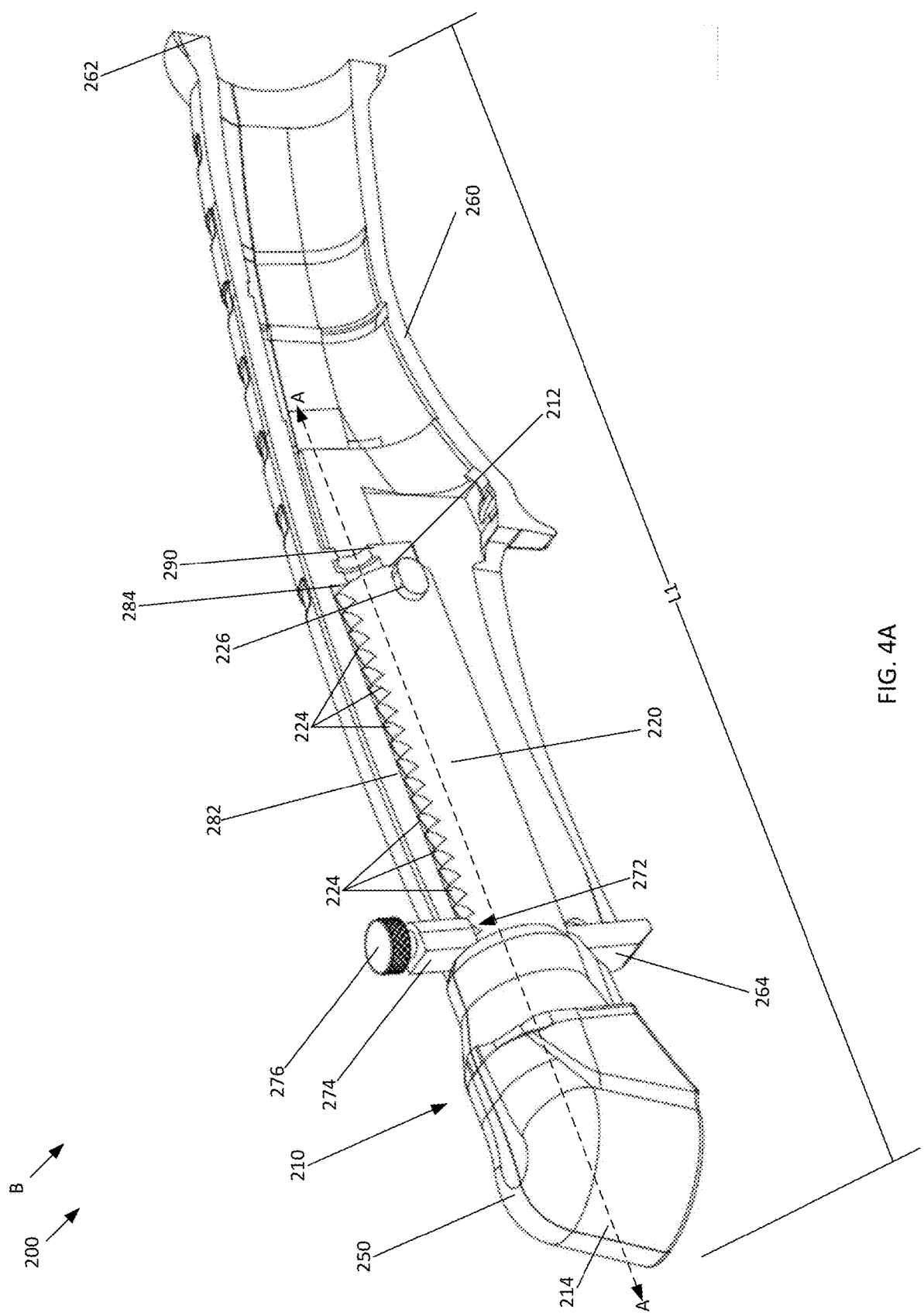
FIG. 4A is a partial sectional view of the torch body of the first example embodiment of the telescoping torch illustrated in FIG. 2A, where the torch head housing is in the fully collapsed configuration.
Figure 4B:
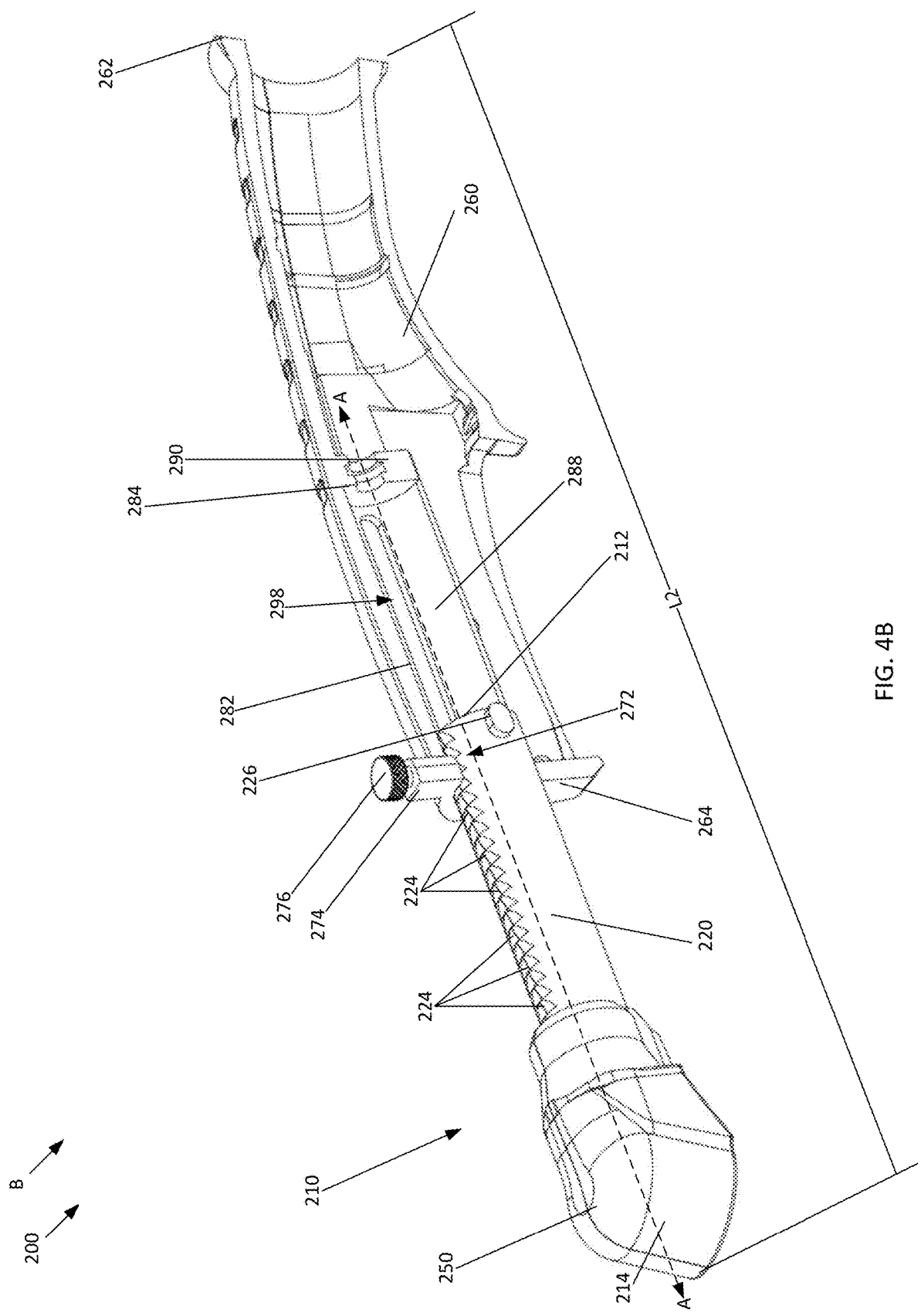
FIG. 4B is a partial sectional view of the torch body of the first example embodiment of the telescoping torch illustrated in FIG. 2A, where the torch head housing is in the fully expanded configuration.

Turning to FIGS. 4A and 4B, illustrated are isolated views of the torch head housing 210 and the torch body housing 260. FIG. 4A illustrates the torch head housing 210 in the collapsed position B with respect to the torch body housing 260, while FIG. 4B illustrates the torch head housing 210 in the expanded position C with respect to the torch body housing 260. As previously explained, the neck portion 220 of the torch head housing 210 is configured to slide into and out of the conduit region 282 of the torch body housing 260 along axis A. As illustrated in FIG. 4A, when in the collapsed position B, the first end 212 of the torch head housing 210 is disposed proximate to first end 284 of the conduit region 282 and the end wall 290 of the conduit region. In the collapsed position B, the neck portion 220 of the torch head housing 210 may be fully disposed within the conduit region 282 of the torch body housing 260. Thus, the torch head portion 250 of the torch head housing 210 may be disposed proximate to, or in abutment with, the second end 264 of the torch body housing 260. In this configuration, the torch 200 has a length of L1. Conversely, in the expanded position C, the neck portion 220 of the torch head housing 210 may only be partially disposed within the conduit region 282 of the torch body housing 260. When fully expanded, as illustrated in FIG. 4B, the first end 212 of the torch head housing 210 is still disposed within the conduit region 282 of the torch body housing 260, but is disposed more proximate to the second end 286 of the conduit region 282 of the torch body housing 260 (i.e., the second end 264 of the torch body housing 260) than the first end 284 of the conduit region 282 of the torch body housing 260. Thus, the torch head portion 250 of the torch head housing 210 may be spaced from the second end 264 of the torch body housing 260 with a portion of the neck portion 220 of the torch head housing 210 being exposed. In this configuration, the torch 200 has a length of L2. As the torch head housing 210 slides or telescopes into and out of the conduit region 282 of the torch body housing 260, the pair of tabs 226 of the neck portion 220 are disposed within, and slide along, the pair of side channels 298 of the sidewalls 288. This interaction between the pair of tabs 226 and the pair of side channels 298 serves two purposes. First, it prevents the torch head housing 210 from rotating about axis A with respect to the torch body housing 260 (i.e., prevents axial rotation of the torch head housing 210 with respect to the torch body housing 260 and vice versa). In addition, the interaction between the pair of tabs 226 and the pair of side channels 298 prevents the torch head housing 210 from sliding or telescoping too far such that the first end 212 slides completely out of the conduit region 282 of the torch body housing 260 (i.e., prevents the neck portion 220 from sliding completely out of the conduit region 282 of the torch body housing 260).

Continuing with FIGS. 4A and 4B, when the torch head housing 210 is in the collapsed position B, the spring loaded pin 276 of the length adjustment mechanism 272 of the torch body housing 260 may be biased through the cylindrical portion 274 of the length adjustment mechanism 272 until a portion of the spring loaded pin 276 protrudes out of bottom side of the cylindrical portion 274 such that the protruding portion of the spring loaded pin 276 engages one of the series of notches 224 of the neck portion 220 of the torch head housing 210 located proximate to the torch head portion 250 in order to secure the torch head housing 210 in the collapsed position B with respect to the torch body housing 260. Conversely, when the torch head housing 210 is in the expanded position C, the spring loaded pin 276 of the length adjustment mechanism 272 of the torch body housing 260 may be biased through the cylindrical portion 274 of the length adjustment mechanism 272 until a portion of the spring loaded pin 276 protrudes out of bottom side of the cylindrical portion 274 such that the protruding portion of the spring loaded pin 276 engages one of the series of notches 224 of the neck portion 220 of the torch head housing 210 located proximate to the first end 212 of the torch head housing 210 in order to secure the torch head housing 210 in the expanded position C with respect to the torch body housing 260. While not illustrated, the protruding portion of the spring loaded pin 276 of the length adjustment mechanism 272 may be configured to engage any one of the series of notches 224 of the neck portion 220 of the torch head housing 210 in a manner similar to that shown and described with regard to FIGS. 4A and 4B to secure the torch head housing 210 in any position with respect to the torch body housing 260 between the collapsed position B and the expanded position C. Thus, the torch 200 may be configured to have any length between L1 (with the torch head housing 210 in the collapsed position B) and L2 (with the torch head housing 210 in the expanded position C)

Turning to FIGS. 5A and 5B, illustrated are cross-sectional views of the torch 200 with the torch head housing 210 in the collapsed position B with respect to the torch body housing 260 (FIG. 5A), and the torch head housing 210 in the expanded position C with respect to the torch body housing 260 (FIG. 5B). As illustrated, and previously explained, at least a portion of the conductor extension tube 340, including the second end 343 of the conductor extension tube 340, is inserted into the first end 332 of the conductor tube 330 and disposed within the central passage 338 of the conductor tube 330. As further illustrated, regardless of the position of the torch head housing 210 with respect to the torch body housing 260, the central passage 345 of the conductor extension tube 340 is coaxially aligned with the central passage 338 of the conductor tube 330, as well as being in fluid communication with the central passage 338 of the conductor tube 330. While not illustrated, when the torch lead or cable hose is coupled to the first end 262 of the torch body housing 260, the first end 342 of the conductor extension tube 340, which is disposed within the connection end cavity 310 of the torch body housing 260, is coupled to the main power supply and the gas/air supply lines. The gas/air supply may be supplied to the torch head 320, and ultimately the consumable assembly 328, via the central passage 338 of the conductor tube 330 and the central passage 345 of the conductor extension tube 340. The air seal gasket 350 prevents gas/air from leaking between the conductor tube 330 and the conductor extension tube 340 because the air seal gasket 350 remains in contact with the exterior surface of the sidewall 344 of the conductor extension tube 340 and the interior surface (i.e., the surface of the central passage 338) of the conductor tube 330. Moreover, the main power may be supplied to the torch head 320, and ultimately the consumable assembly 328, via the conductor tube 330 and conductor extension tube 340 because both are at least partially constructed from conductive materials. The conductive compliant contact 360 disposed in the second annular depression 349 of the second end 343 of the conductor extension tube 340, and disposed within the central passage 338 of the conductor tube 330, is configured to maintain a conductive connection between the conductor tube 330 and the conductor extension tube 340 (i.e., the conductive compliant contact 360 remains in contact with the exterior surface of the sidewall 344 of the conductor extension tube 340 and the interior surface of the central passage 338 of the conductor tube 330) as the torch head housing 210 slides or telescopes into and out of the torch body housing 260 (and as the second end 343 of the conductor extension tube 340 slides or telescopes through the central passage 338 of the conductor tube 330). Thus, the main power may be transferred from the torch lead or cable hose, through the conductor extension tube 340, through the conductive compliant contact 360, through the conductor tube 330, to the torch head 320, and ultimately to the consumable assembly 328.

As further illustrated in FIGS. 5A and 5B, and as previously explained, the first pilot wire 370 may be disposed within the second interior channel 240 of neck portion 220 of the torch head housing 210, while the second pilot wire 380 may be disposed within the torch body housing 260 such that the second pilot wire 380 extends through both the lower cavity 300 and the connection end cavity 310. Moreover, as previously explained, as the torch head housing 210 slides into and out of the torch body housing 260 between the collapsed position B and the expanded position C, the pilot return contact 376 of the first pilot wire 370, which extends out of the lower opening 246 on the bottom side of the neck portion 220 of the torch head housing 210 proximate to the first end 212 of the torch head housing 210, slides or drags along the exposed contact portion 388 of the second pilot wire 380 to maintain the electrical connection between the first pilot wire 370 and the second pilot wire 380. While not illustrated, the first end 382 of the second pilot wire 380 may be coupled to the pilot line of a torch lead or cable hose when the torch lead or cable hose are coupled to the first end 262 of the torch body housing 260. Thus, the first pilot wire 370 and the second pilot wire 380 are configured to maintain a connection with one another, through the abutment of the pilot return contact 376 of the first pilot wire 370 with any part or portion of the exposed contact portion 388 of the second pilot wire 380 to transfer the pilot electrical signal from the consumable assembly 328 of the torch head 320 to the torch lead or cable hose.

Turning to FIGS. 6A, 6B, 7A, and 7B, illustrated is a second embodiment of the torch 400. The second embodiment of the torch 400 is substantially similar to the first embodiment of the torch 200 in that the torch 400 includes many of the same components as the first embodiment of the torch 200, and operates in a substantially similar manner such that portions of the torch 400 telescope or slide with respect to other portions between a collapsed position D and an expanded position E (i.e., the length of the torch 400 is also adjustable). For example, like the first embodiment of the torch 200, the second embodiment of the torch 400 includes a torch head housing 410, a torch head 520 disposed within the torch head portion 450 of the torch head housing 410, and a conductor tube 530 disposed within the neck portion 420 of the torch head housing 410. The torch head housing 410 of the torch 400 may be substantially similar to the torch head housing 210 of the first embodiment of the torch 200 except that unlike the second interior channel 240 of the neck portion 220 of the torch head housing 210, the second interior channel 440 of the neck portion 420 of the torch head housing 410 may extend entirely through the neck portion 420 from the torch head portion 450 to the first end 402 of the torch head housing 410. Thus, the first end 402 of the torch head housing 410 may have two openings disposed in it, the opening 436 of the first end 432 of the first interior channel 430, within which the conductor tube 530 is disposed, and the opening 446 of the first end 442 of the second interior channel 440.

In addition, like the first embodiment of the torch 200, the second embodiment of the torch 400 may also similarly include a torch body housing 460 having an exterior surface 470 with an adjustment mechanism 472 with an interior 480 with a conduit region 482, lower cavity 500, and connection end cavity 510. Unlike the torch body housing 260 of the first embodiment of the torch 200, the end wall 490 between the conduit region 482 and the connection end cavity 510 of the torch body housing 460 of second embodiment of the torch 400 includes a first aperture 492, which is similar to the aperture 292 of the end wall 490 of the torch 200, and a second aperture 496. Both the first and second apertures 492, 496 extend through the end wall 490 between the conduit region 482 and the connection end cavity 510. Furthermore, the conduit region 482 may not include a lower longitudinal slot disposed within the sidewalls 488 like that of the conduit region 282 of the torch body housing 260 of the first embodiment of the torch 200. In addition, the connection end cavity 510 may include a curved passageway 518 disposed within the connection end cavity 510 proximate to the second end 514 of the connection end cavity 510 and the end wall 490.

Similar to the first embodiment of the torch 200, the second embodiment of the torch 400 includes a conductor extension tube 540 that is substantially similar to the conductor extension tube 340 in that the conductor extension tube 540 may be disposed within the first aperture 492 of the end wall 490, may include a flange 546 that is disposed within the slot 494 around the first aperture 492 of the end wall 490, may extend through the conduit region 482 of the torch body housing 460, may include an air seal gasket 550 disposed within a first annular depression 548 located proximate to the second end 543 of the conductor extension tube 540, and may include a conductive compliant contact 560 disposed within the second annular depression 549 located proximate to the second end 543 of the conductor extension tube 540. Moreover, the conductor extension tube 540, like the conductor extension tube 340, may be smaller in diameter than the conductor tube 530 such that the second end 543 of the conductor extension tube 540 may be disposed within the central passage 538 of the conductor tube 530. Thus, the conductor tube 530 may be configured to slide over the conductor extension tube 540, or the conductor extension tube 540 may slide within the central passage 538 of the conductor tube 530, as the torch head housing 410 is repositioned between the collapsed position D and the expanded position E with respect to the torch body housing 460.

Figure 7A:
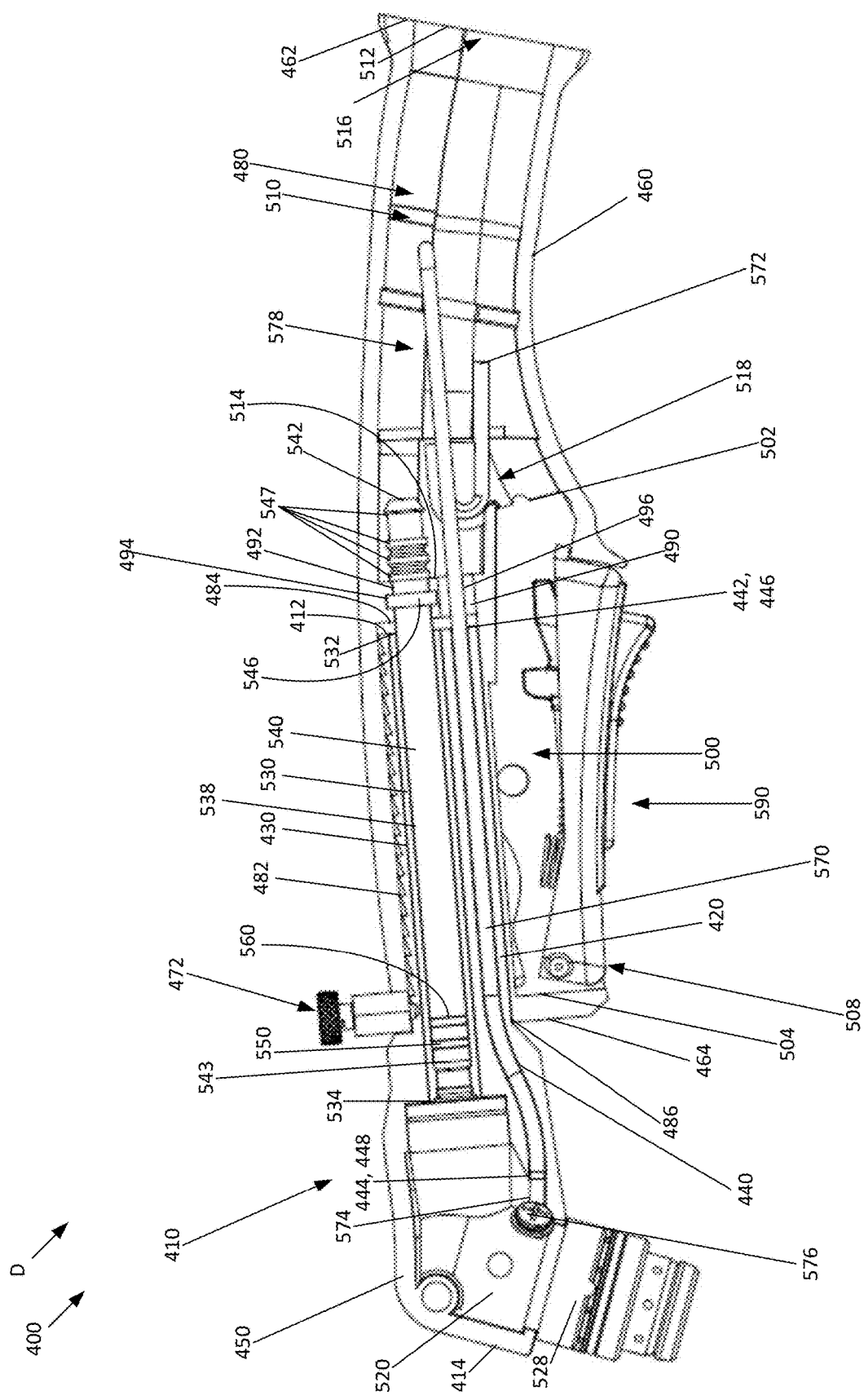
FIG. 7A is a cross-sectional view of the second example embodiment of the telescoping torch illustrated in FIG. 6A, where the telescoping torch is in the fully collapsed configuration.
Figure 7B:
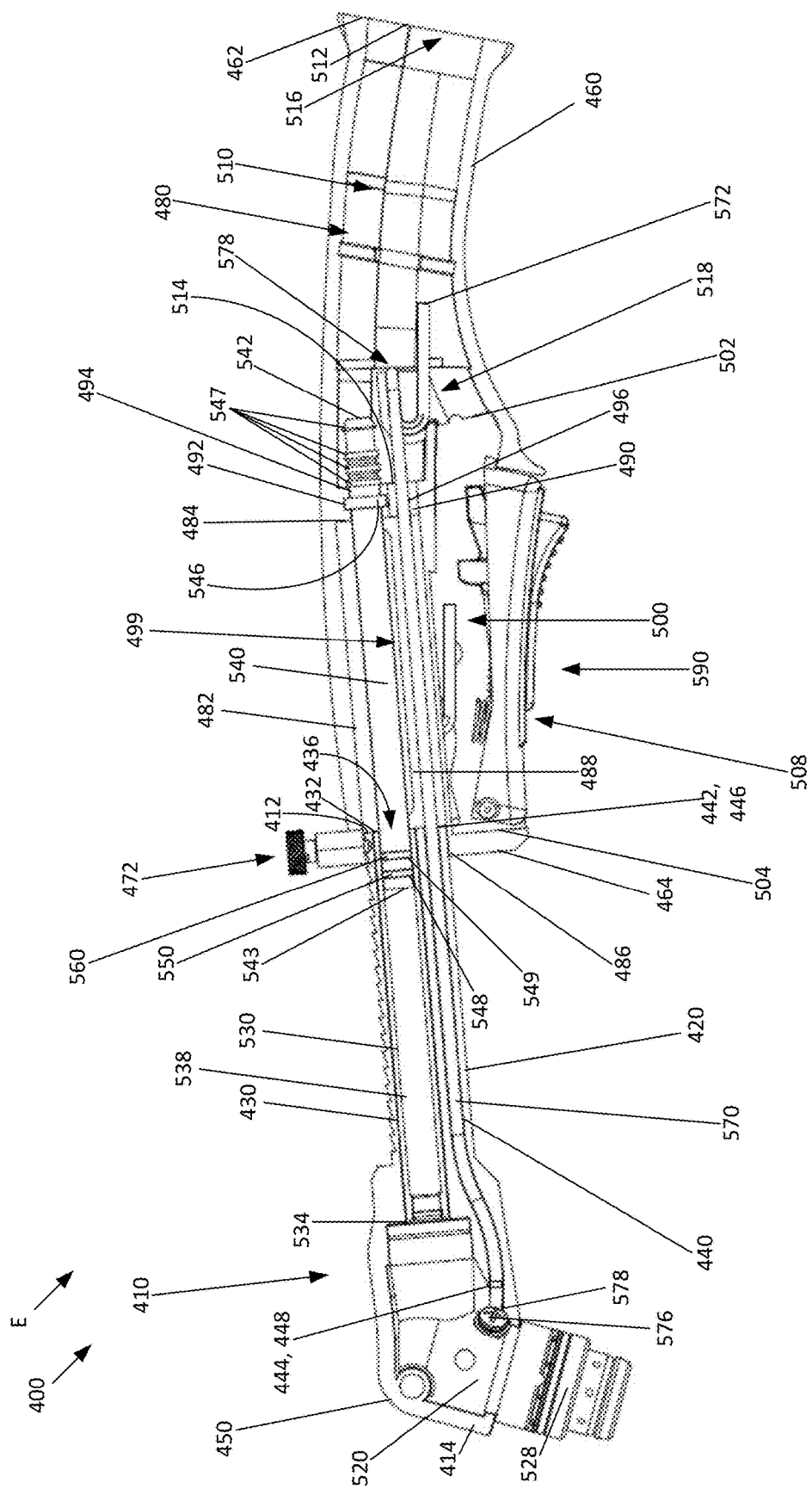
FIG. 7B is a cross-sectional view of the second example embodiment of the telescoping torch illustrated in FIG. 6A, where the telescoping torch is in the fully expanded configuration.

The second embodiment of the torch 400 may further differ from the first embodiment of the torch 200 in that the second embodiment of the torch 400 may include a single flexible pilot return wire 570 rather than a first pilot wire 370 with a pilot return contact 376 that drags along the exposed contact portion 388 of a second pilot wire 380. As best illustrated in FIGS. 7A and 7B, the flexible pilot return wire 570 may have a first end 572 disposed within the interior 480 of the torch body housing 460 and an opposite second end 574 that may be coupled to, or disposed within, the pilot connector opening 529 (not shown) of the torch head 520 via a fastener or connector 576. The flexible pilot return wire 570 may extend through the second interior channel 440 of the neck portion 420 of the torch head housing 410, through the conduit region 482 of the torch body housing 460, through the second aperture 496 of the end wall 490 of the conduit region 482, and through the curved passageway 518 of the connection end cavity 510. As illustrated best in FIG. 7A, when the torch head housing 410 is in the collapsed position D, the flexible pilot return wire 570 has an excess or bunched segment 578 that gathers in the connection end cavity 510. Disposing the flexible pilot return wire 570 within the curved passageway, which may be substantially U shaped, causes the excess segment 578 of the flexible pilot return wire 570 to bunch up or gather within the connection end cavity 510. However, as shown in FIG. 7B, as the torch head housing 410 telescopes out of the conduit region 482 of the torch body housing 460, the flexible pilot return wire 570 is pulled through the second aperture 496 of the end wall 490 of the conduit region 482, and through the conduit region 482, which reduces the amount of the excess segment 578 of the flexible pilot return wire 570 within the connection end cavity 510. As illustrated in both FIGS. 7A and 7B, the flexible pilot return wire 570 is a continuous wire, and may be configured to transfer the pilot electrical signal from the consumable assembly 528 of the torch head 520, which may be coupled to the second end 574 of the flexible pilot return wire 570, to the torch lead or cable hose, which may be coupled to the first end 572 of the flexible pilot return wire 570.

Figure 8A:
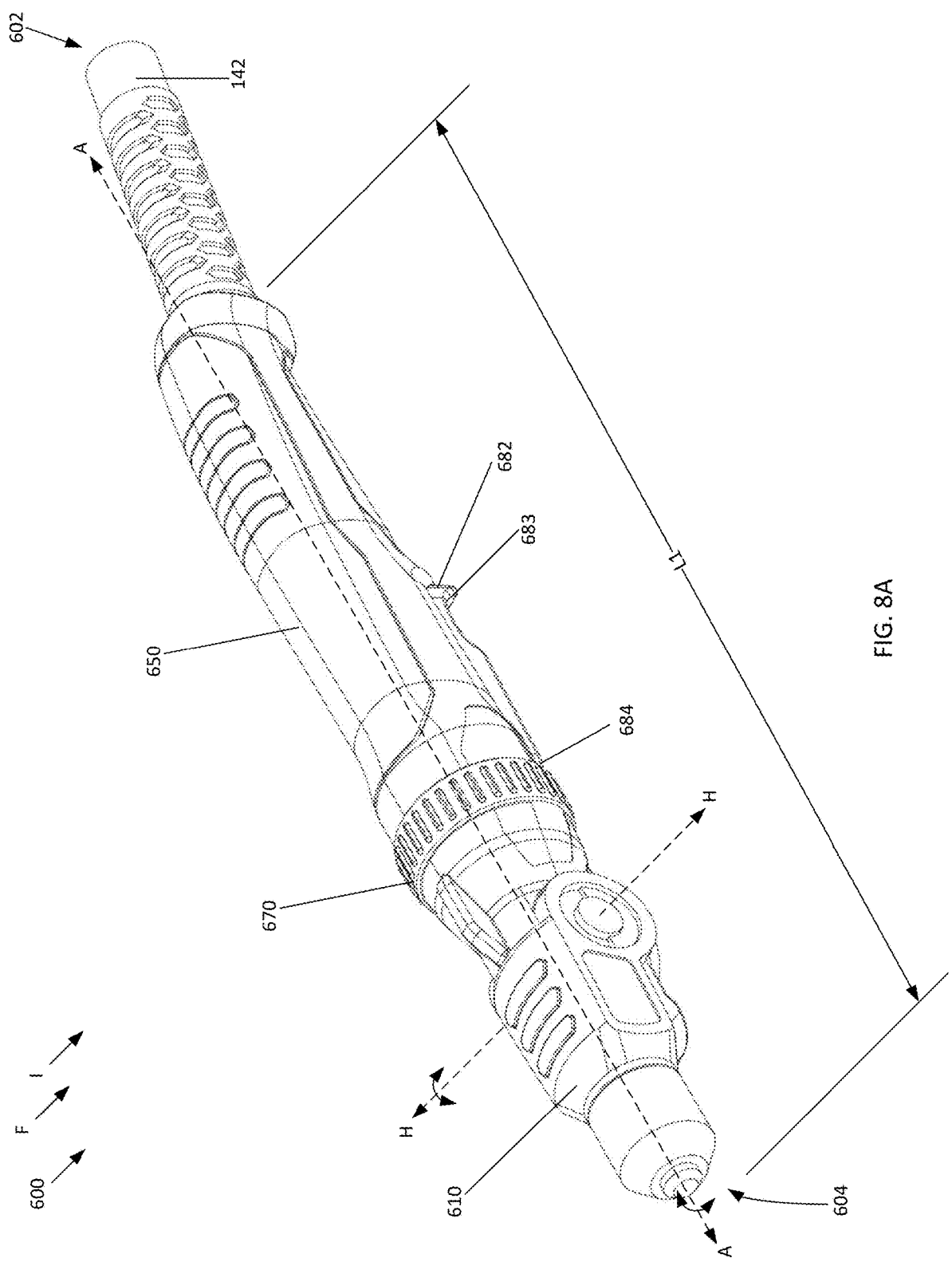
FIG. 8A is a perspective view of an embodiment of an adjustable torch according to the present disclosure, where the adjustable torch is in the fully collapsed configuration and the torch head portion is in the aligned configuration.
Figure 8B:
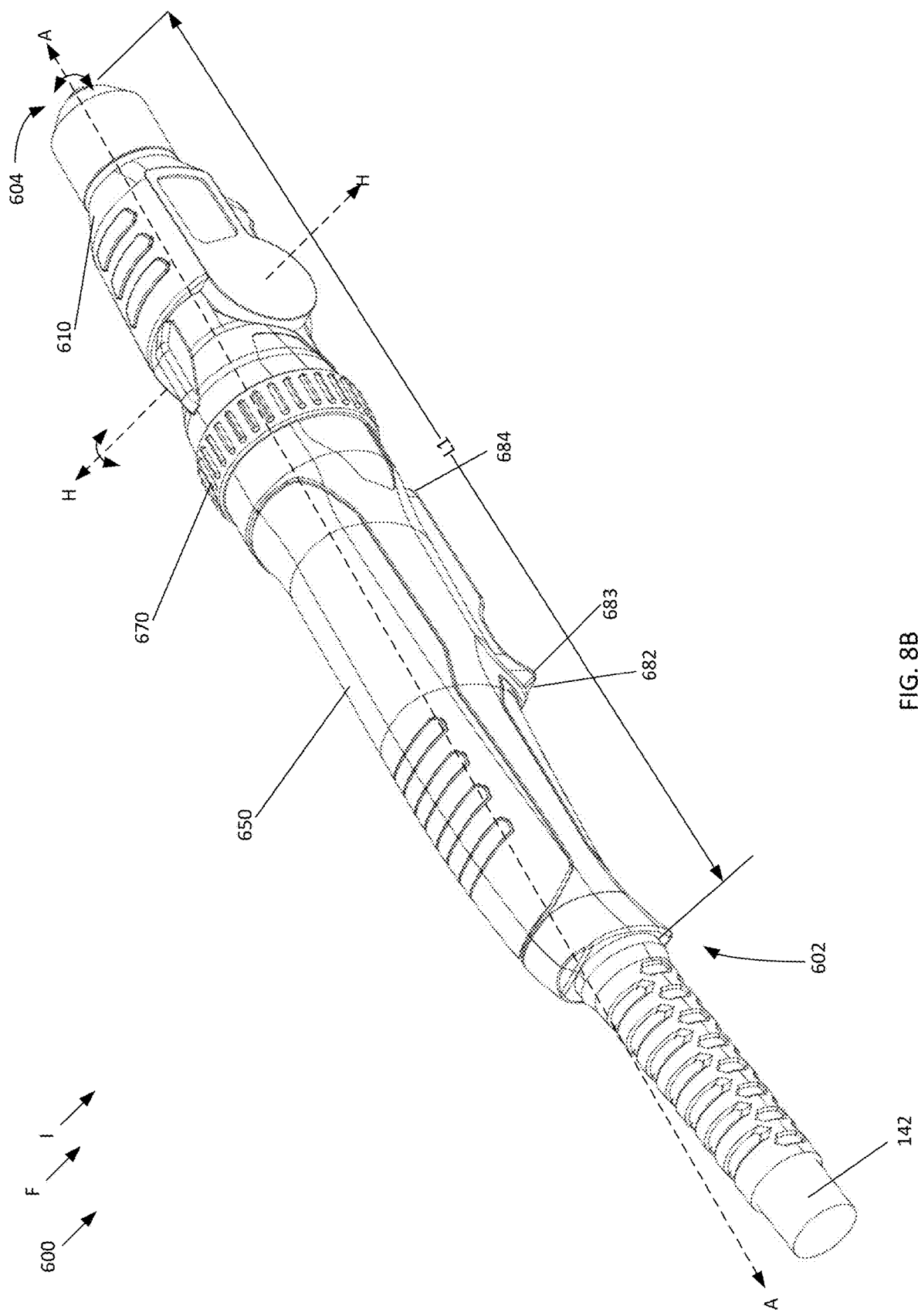
FIG. 8B is another perspective view of the embodiment of the adjustable torch illustrated in FIG. 8A.

Turning to FIGS. 8A and 8B, illustrated is an embodiment of a torch 600 with multiple degrees of adjustment, multiple adjustment features, and/or that has multiple modes of reconfiguration. The torch 600 may be elongated with a first end 602 (e.g., the connection end) and an opposite second end 604 (e.g., the operating end). The torch 600 may include a torch head housing 610 (e.g., first torch portion) and a torch handle housing 650 (e.g., second torch portion). The torch head housing 610 may be disposed more proximate to the second end 604 of the torch 600 than the first end 602 of the torch 600. Furthermore, the torch handle housing 650 may be disposed more proximate to the first end 602 of the torch 600 than the second end 604 of the torch 600. As explained in further detail below, the torch head housing 610 may be configured to telescope, axially extend, expand, or slide along central longitudinal axis A of the torch 600 between at least a collapsed position F (FIGS. 8A and 8B), where the torch head housing 610 may be fully telescoped into the torch handle housing 650 and the torch may have a length L1, and an expanded position G (FIG. 11), where the torch head housing 610 may be fully telescoped out of the torch handle housing 650 and the torch 600 may have a length L2. The length L2 may be longer than the length L1. In some embodiments, the torch head housing 610 may be telescoped out of the torch handle housing 650 to any number of positions between the collapsed position F and the expanded position G, where the length of the torch 600 in any of those positions is greater than the length L1 but less than the length L2.

As also further explained below, the torch head housing 610 may be configured to rotate or twist about axis A with respect to the torch handle housing 650. For example, as illustrated in FIGS. 15A-15D, the torch head housing 610 is rotated 180 degrees about central longitudinal axis A with respect to the torch handle housing 650. While FIGS. 15A-15D illustrate the torch head housing 610 rotated 180 degrees with respect to the torch handle housing 650, as compared to FIGS. 8A and 8B, the torch head housing 610 may be capable of rotating any amount between 0 degrees and 360 degrees (and in some embodiments, more than 360 degrees) with respect to the torch handle housing 650.

Figure 13A:
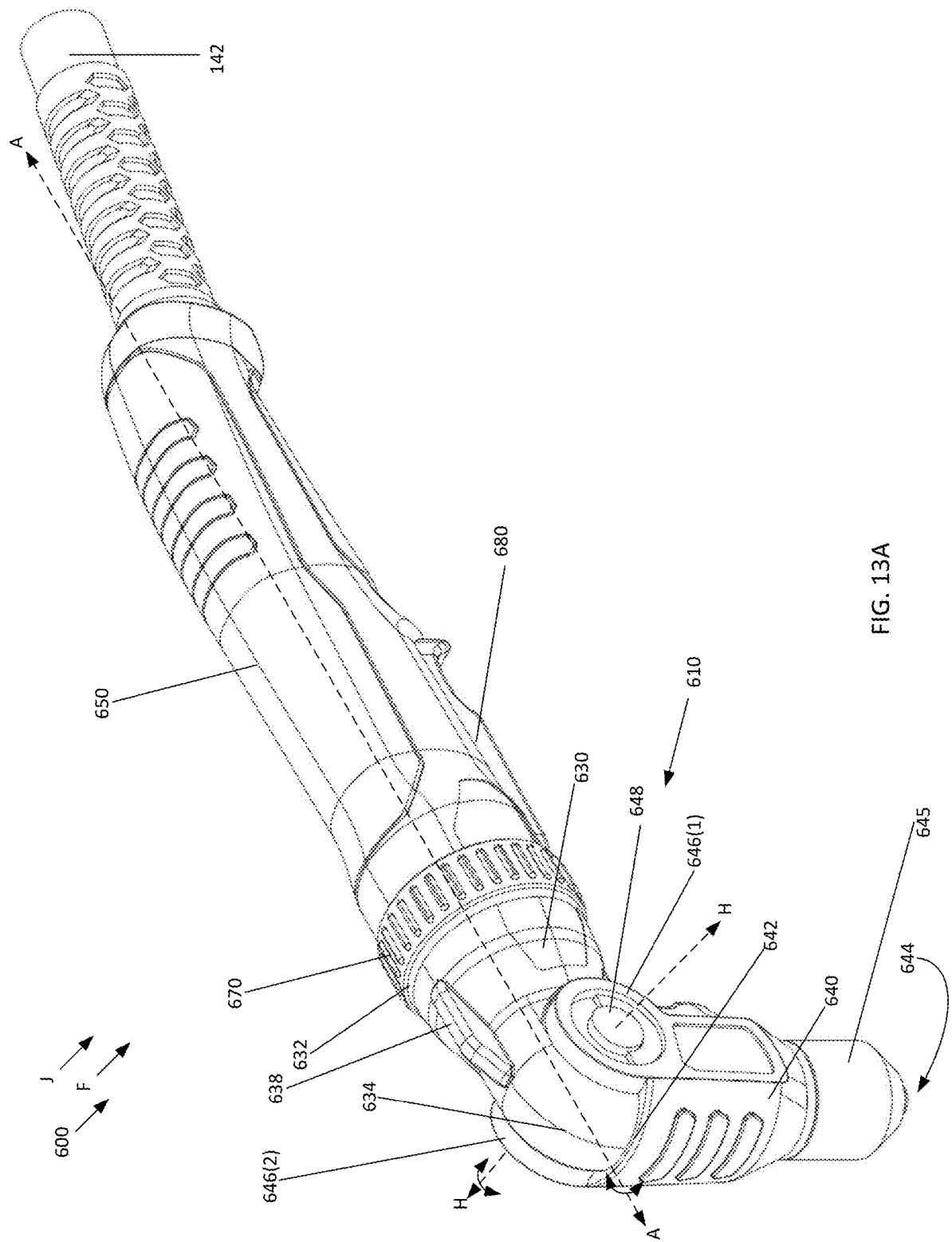
FIG. 13A is a perspective view of the embodiment of the adjustable torch illustrated in FIG. 8A, where the adjustable torch is in the fully collapsed configuration and the torch head portion is in the offset configuration.
Figure 13B:
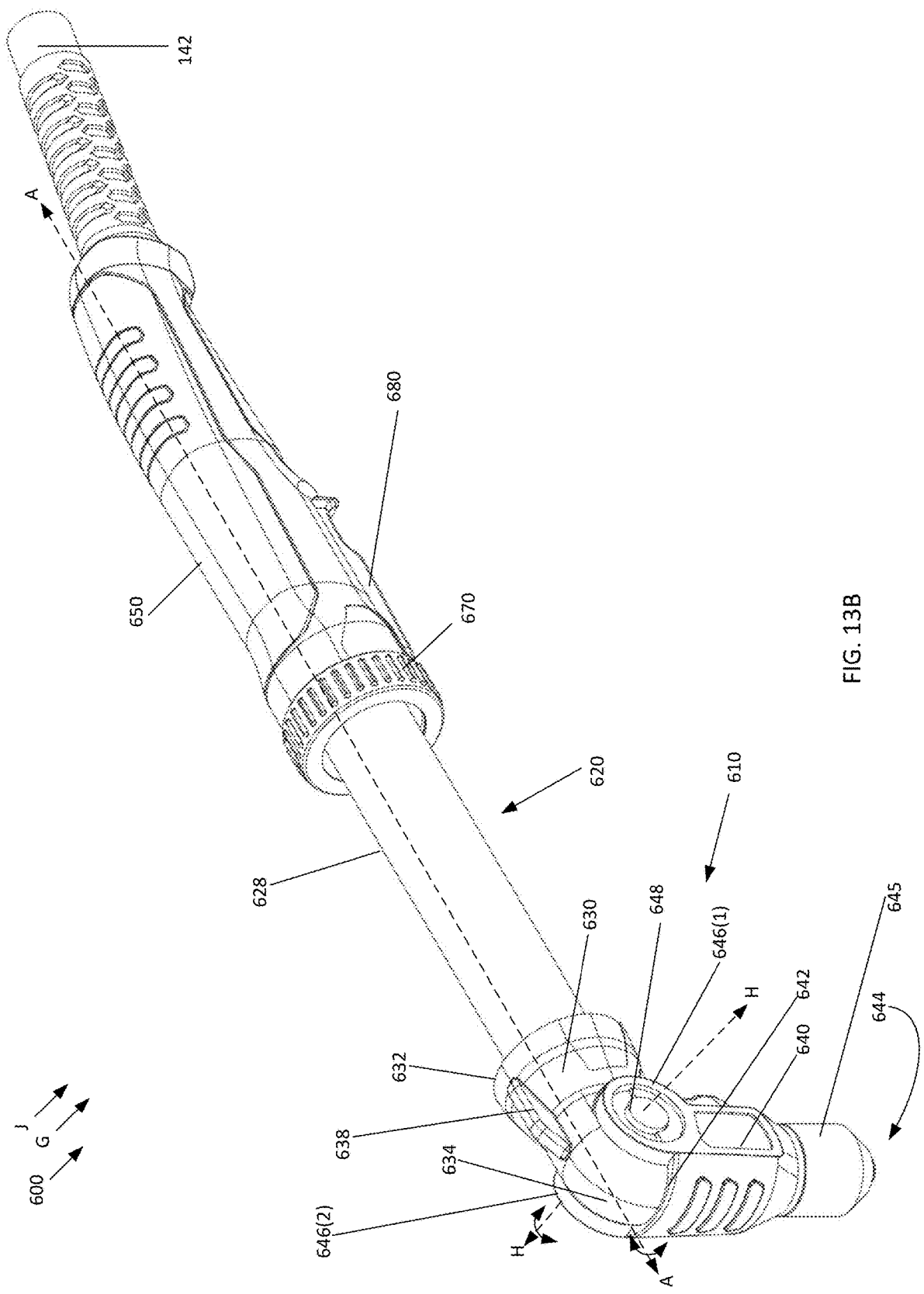
FIG. 13B is a perspective view of the embodiment of the adjustable torch illustrated in FIG. 8A, where the adjustable torch is in the fully expanded configuration and the torch head portion is in the offset configuration.
Figure 14:
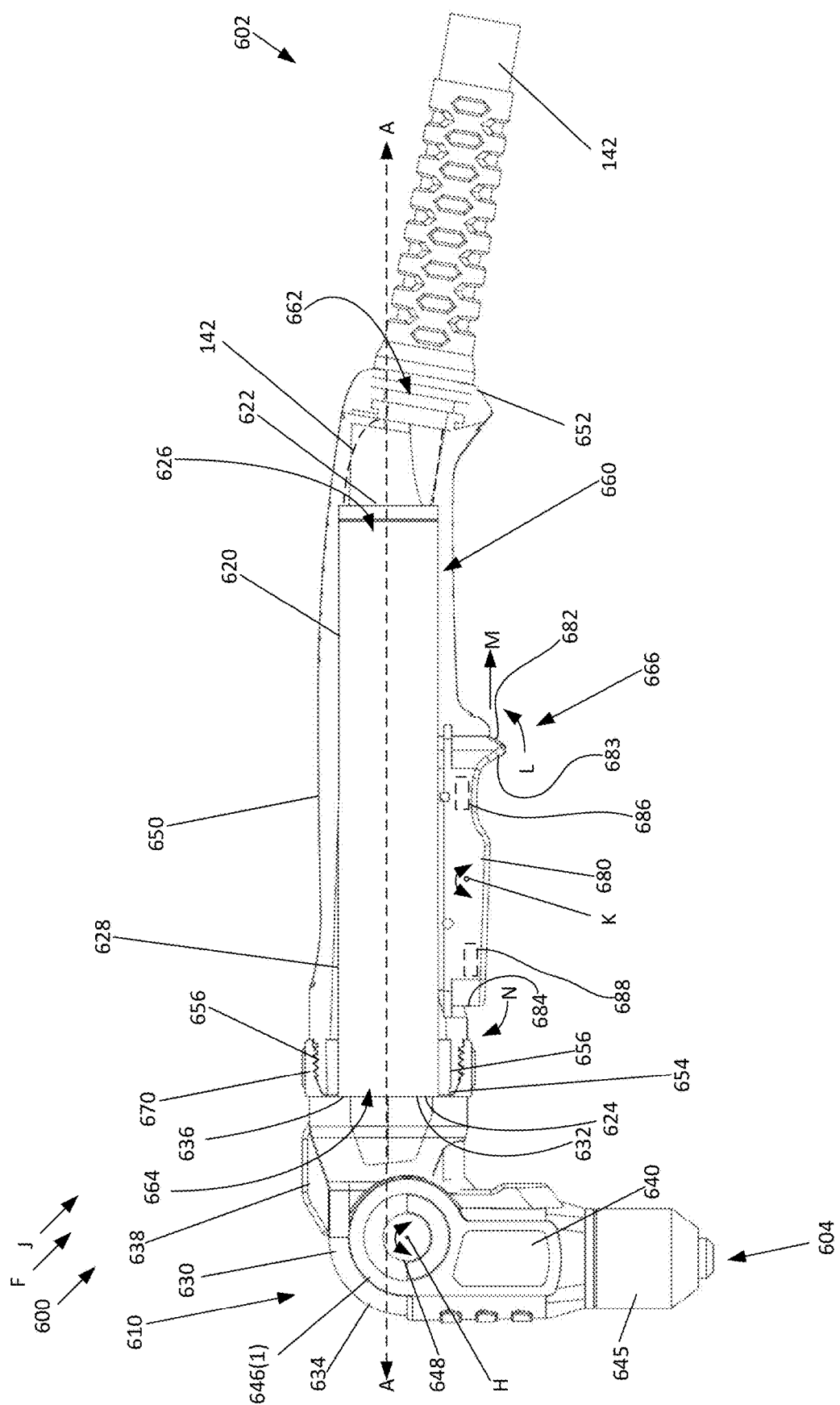
FIG. 14 is a cross-sectional view of the adjustable torch illustrated in FIG. 8A, where the adjustable torch is in the fully collapsed configuration and the torch head portion is in the offset configuration.

As explained in further detail below, and best shown in FIGS. 13A, 13B, and 14, a portion of the torch head housing 610 may be configured to pivot about transverse axis H with respect to the other portions of the torch 600, where the transverse axis H may be oriented substantially perpendicular to the central longitudinal axis A.

Figure 9A:
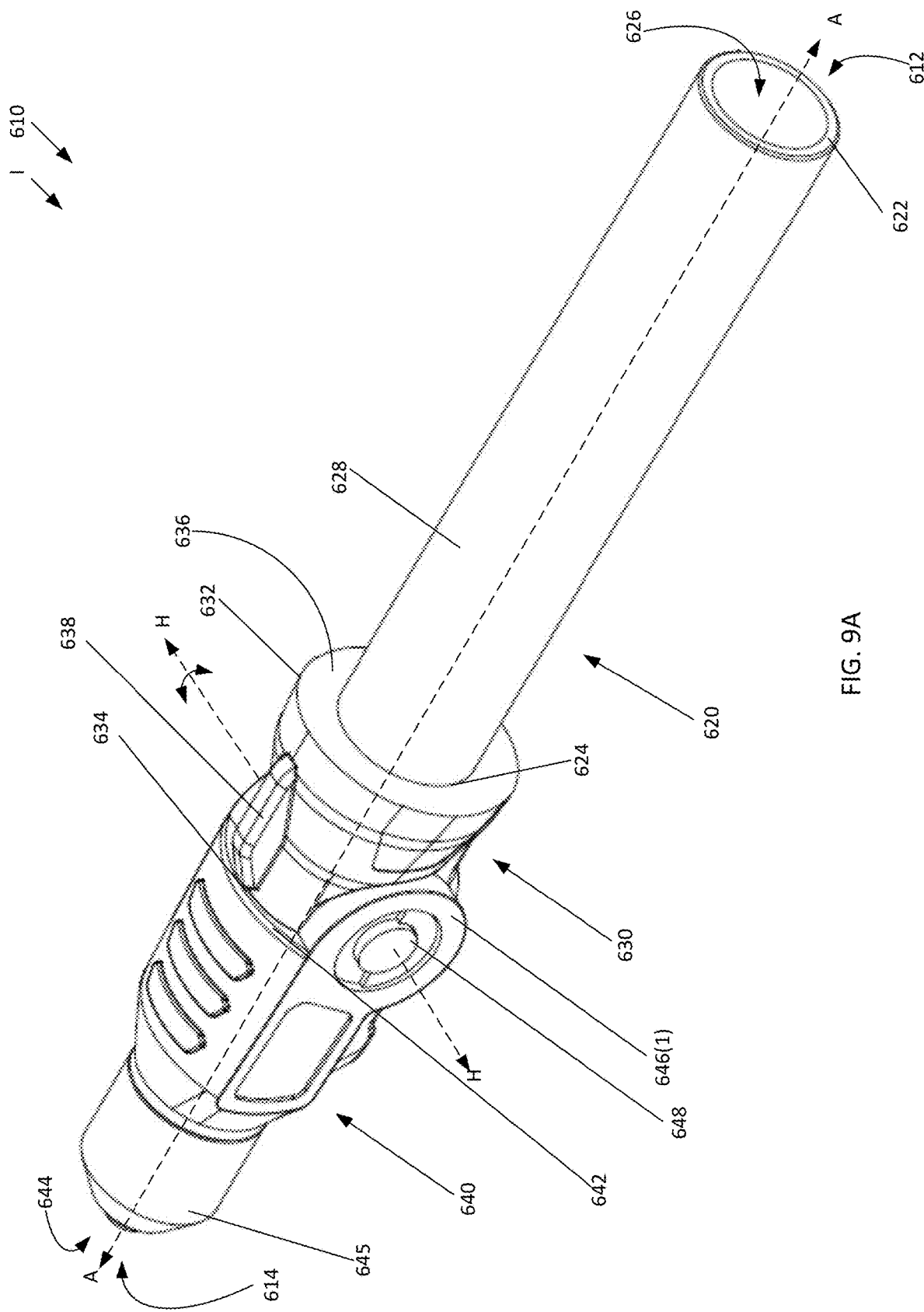
FIG. 9A is a perspective view of the torch head housing of the adjustable torch illustrated in FIG. 8A.
Figure 9B:
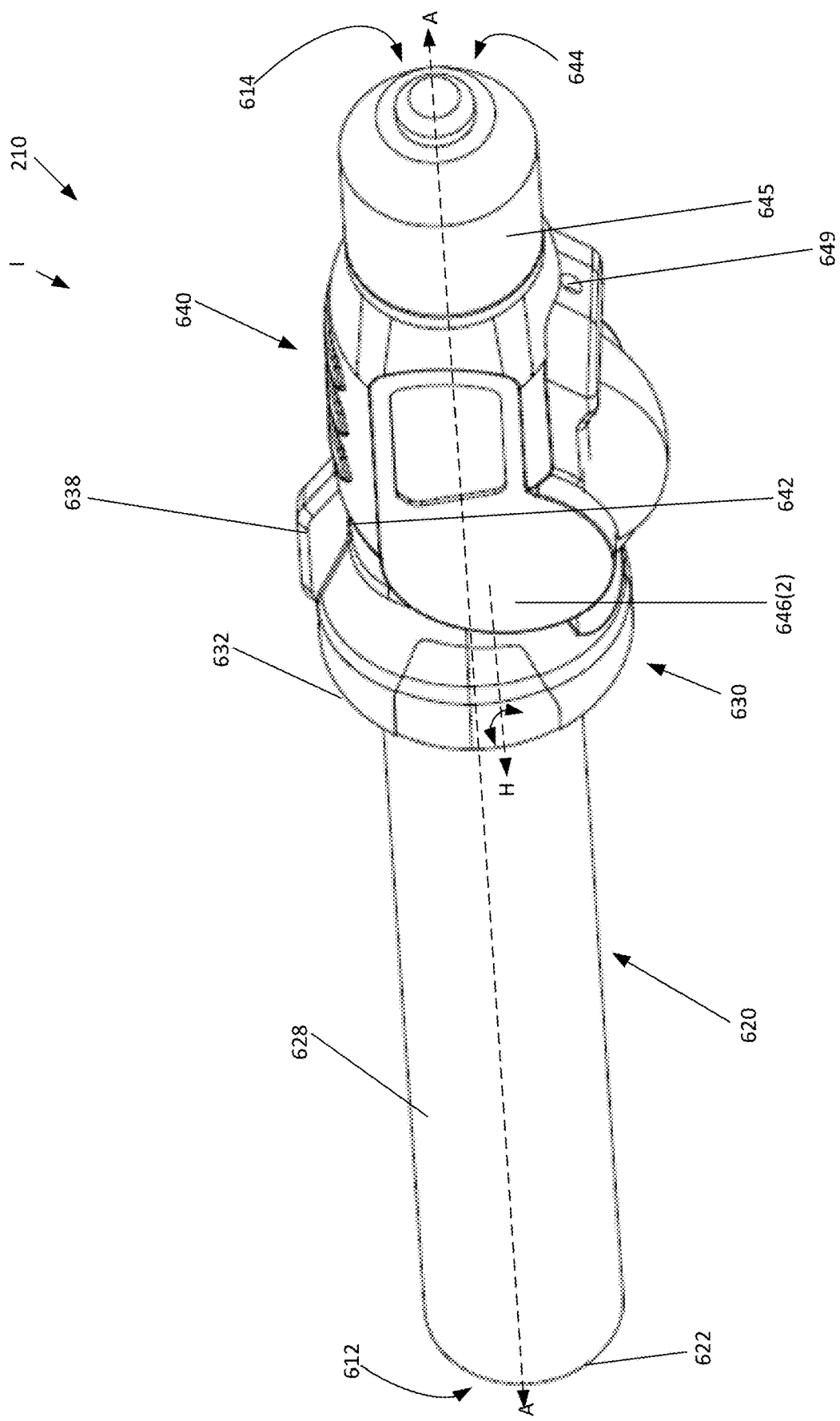
FIG. 9B is another perspective view of the torch head housing illustrated in FIG. 9A.

Turning to FIGS. 9A and 9B, illustrated are isolated views of the torch head housing 610, the torch head housing 610 may include a first end 612 (i.e., connection end) and an opposite second end 614 (i.e., consumable end). The torch head housing 610 may further include a neck portion 620, a stationary intermediate portion 630, and a torch head portion 640. In some embodiments, as illustrated in FIG. 9A, the neck portion 620 may be an annular cylinder with a first end 622 and an opposite second end 624. The neck portion 620 may define a conduit 626 that spans through the neck portion 620 from the first end 622 to the second end 624. The neck portion 620 may also contain an exterior surface 628. In some other embodiments, the neck portion 620 may have another shape, such as, but not limited to, a square conduit, rectangular conduit, pentagonal conduit, etc.

The intermediate portion 630 of the torch head housing 610 may also include a first end 632, which is coupled to the second end 624 of the neck portion 620, and an opposite second end 634. While not illustrated, the intermediate portion 630 may define an interior cavity that is in fluid communication with the conduit 626 of the neck portion 620. As illustrated in FIG. 9A, the first end 632 of the intermediate portion 630 may have a larger diameter than the second end 624 of the neck portion 620 such that the first end 632 of the intermediate portion 630 defines a flange 636. In some embodiments, the neck portion 620 may have an outer diameter of approximately 1 and ⅛ inches. FIG. 9A further illustrates that the intermediate portion 630 includes a sail or projection 638 that extends from the outer or exterior surface of the intermediate portion 630. The projection 638 may be shaped and configured to be used as a hammer or impact device for striking objects and/or a work surface.

The torch head portion 640 of the torch head housing 610 may include a first end 642, which is pivotably coupled to the second end 634 of the intermediate portion 630, and an opposite second end 644. The torch head portion 640 may be configured to removably receive a consumable or consumable assembly 645 at the second end 644 of the torch head portion 640. While not illustrated, the torch head portion 640 may define an interior cavity that is in fluid communication with the conduit 626 of the neck portion 620 and the interior cavity of the intermediate portion 630. As illustrated in FIGS. 9A and 9B, the first end 642 of the torch head portion 640 may include flanges 646(1), 646(2) that extend from the first end 642 of the torch head portion 640 along the intermediate portion 630, and on opposing sides of the intermediate portion 630 (i.e., so that at least a portion of the second end 634 of the intermediate portion 630 is at least partially oriented between the flanges 646(1), 646(2)). A pivot lock or locking D-ring 648 may be disposed on at least the flange 646(1) as illustrated in FIG. 9A. As explained in further detail below, the pivot lock 648 may be configured to enable or permit the torch head portion 640 to pivot about transverse axis H when the pivot lock 648 is actuated, while also being configured to lock the torch head portion 640 in a desired pivot position with respect to the intermediate portion 630 and other portions of the torch 600. The torch head portion 640 may further include, as best illustrated in FIG. 9B, a visual output device (e.g., light emitting diode (LED)) 649 disposed beneath the consumable assembly 645, where the visual output device 649 may be configured to generate a visual output in the general direction that the second end 644 of the torch head portion 640 (and consumable assembly 645) is facing (i.e., toward a work surface).

Figure 10A:
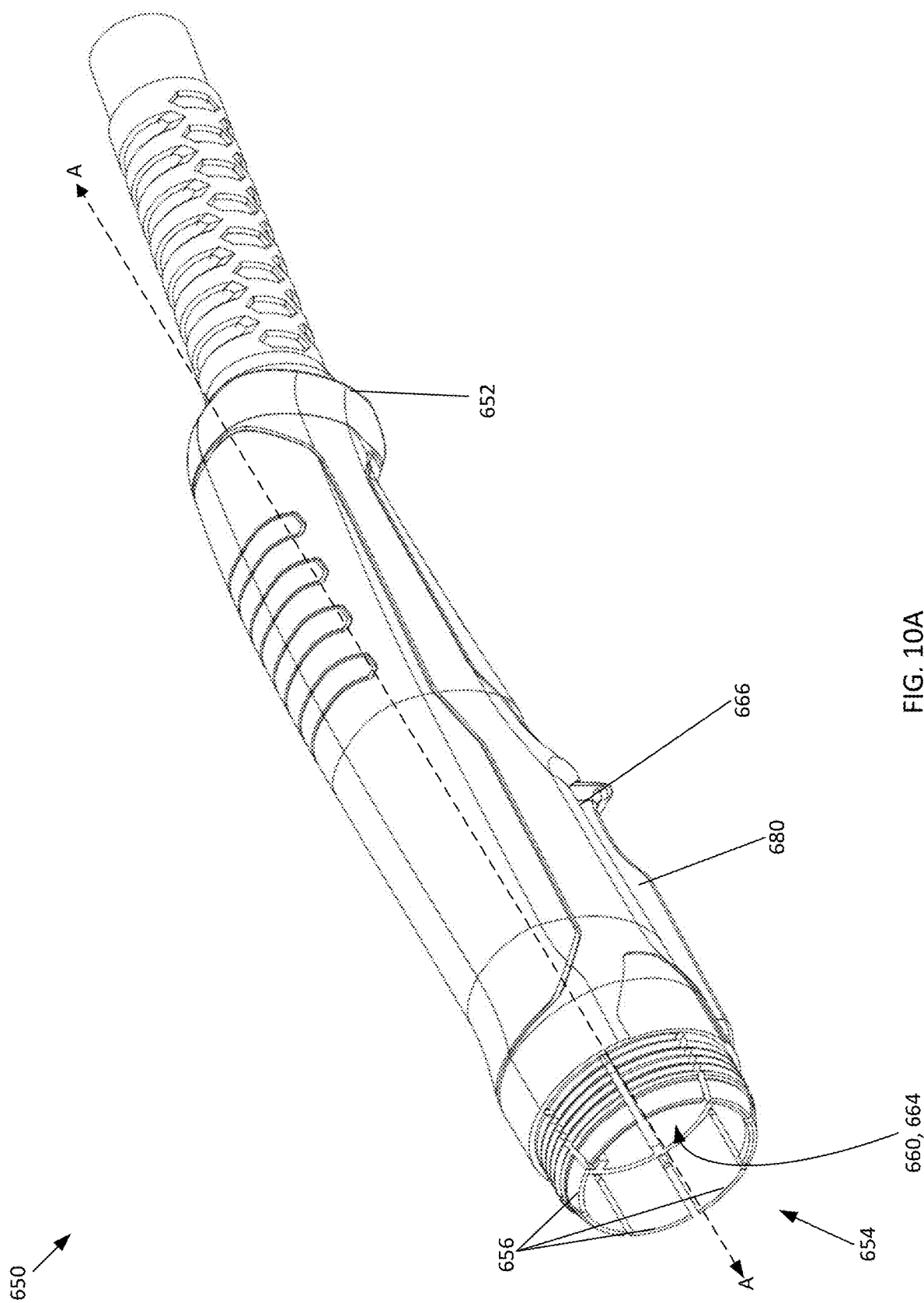
FIG. 10A is a perspective view of the torch handle housing of the adjustable torch illustrated in FIG. 8A.
Figure 10B:
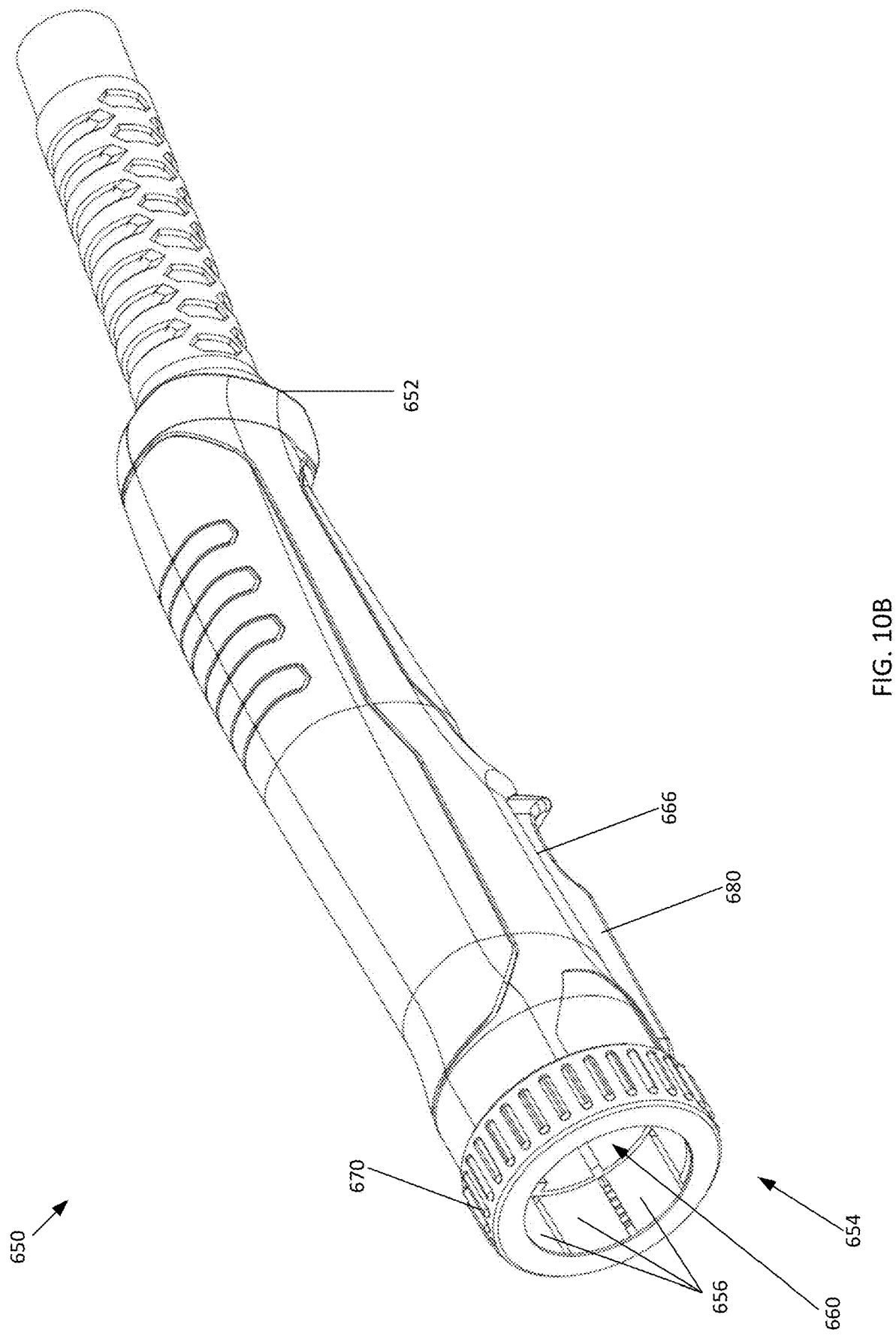
FIG. 10B is a perspective view of the torch handle housing illustrated in FIG. 10A, where the collar has been threaded onto the torch handle housing.

With reference to FIGS. 10A and 10B, the torch handle housing 650 may be an elongated generally cylindrical body that also includes a first end 652 and an opposite second end 654. As best illustrated in FIG. 10A, the second end 654 of the torch handle housing 650 may include a series of annular tabs 656 that are each configured to be hingedly coupled to the second end 654 of the torch handle housing 650. More specifically, the annular tabs 656 may be coupled to the second end 654 of the torch handle housing 650 such that the annular tabs 656 operate as living hinges with respect to the torch handle housing 650. As further illustrated in FIG. 10A, the torch handle housing 650 may define an interior cavity 660. The torch handle housing 650 may further include a first opening 662 disposed in the first end 652 of the torch handle housing 650 (best illustrated in FIGS. 12A and 12B), and a second opening 664 disposed in the second end 654 of the torch handle housing 650. As further detailed below, the interior cavity 660 may be configured to slidably receive the neck portion 620 of the torch head housing 610 via the second opening 664 in the second end 654 of the torch handle housing 650. The torch handle housing 650 may also include a third elongated opening 666 disposed within the sidewall of the torch handle housing 650 between the first end 652 and the second end 654.

As best illustrated in FIG. 10B, the torch handle housing 650 may further include a collet or lock ring 670 that is threaded onto/around the annular tabs 656 of the second end 654 of the torch handle housing 650. When the lock ring 670 is rotated about the central axis A in a first direction, the lock ring 670 is tightened onto the annular tabs 656, which causes the annular tabs 656 to converge axially toward one another (i.e., the annular tabs 656 bend toward the central longitudinal axis A via their living hinge connection to the second end 654 of the torch handle housing 650). When the lock ring 670 is rotated about the central axis A in a second direction, which is opposite the first direction, the lock ring 670 is loosened from the annular tabs 656, which enables the annular tabs 656 to at least partially diverge from one another (i.e., the annular tabs 656 bend outwardly from the central longitudinal axis A via their living hinge connection to the second end 654 of the torch handle housing 650 after having been previously tightened toward the central longitudinal axis A).

As best illustrated in FIGS. 8A, 8B, 10A, 10B, 12A, and 12B, a trigger 680 may be movably disposed within the third elongated opening 666 of the torch handle housing 650 such that the trigger 680 at least partially extends through the third elongated opening 666. As explained in further detail below, the trigger 680 may be actuated by moving or repositioning the trigger 680 in a certain manner with respect to the torch handle housing 650 to activate the plasma arc torch 600 and/or activate the visual output device 649.

Figure 11:
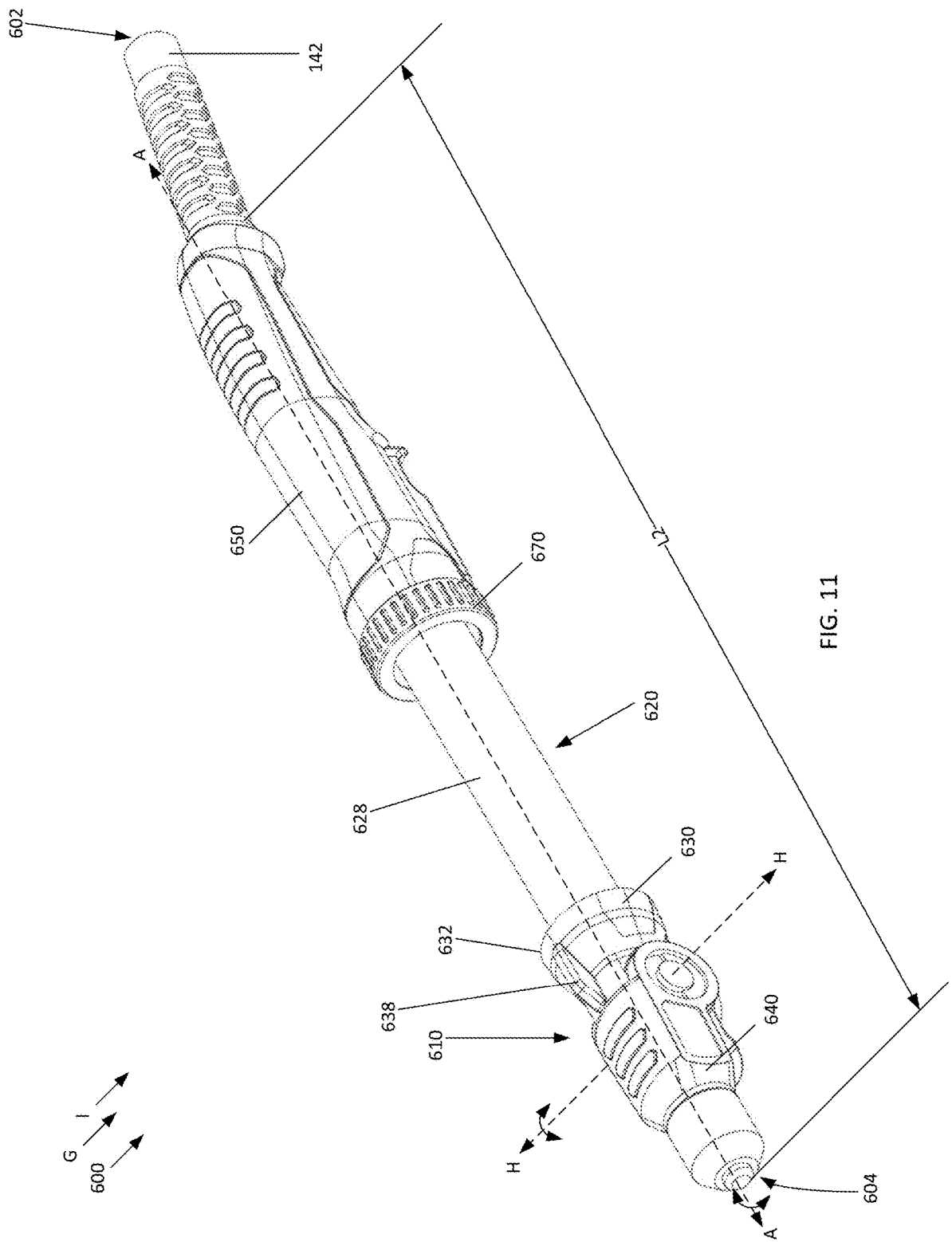
FIG. 11 is a perspective view of the embodiment of the adjustable torch illustrated in FIG. 8A, where the adjustable torch is in the fully expanded configuration and the torch head portion is in the aligned configuration.
Figure 12A:
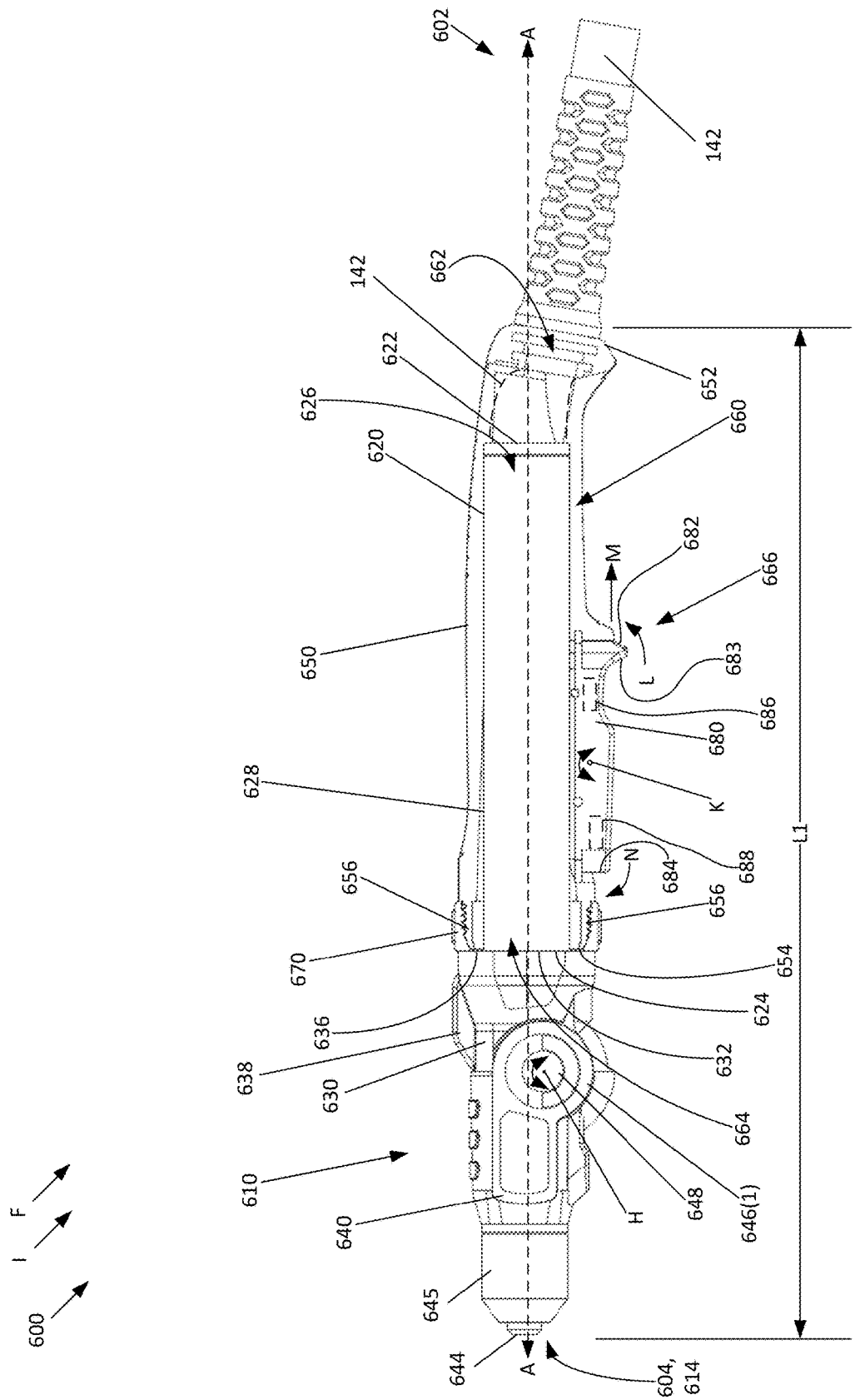
FIG. 12A is a cross-sectional view of the adjustable torch illustrated in FIG. 8A, where the adjustable torch is in the fully collapsed configuration and the torch head portion is in the aligned configuration.
Figure 12B:
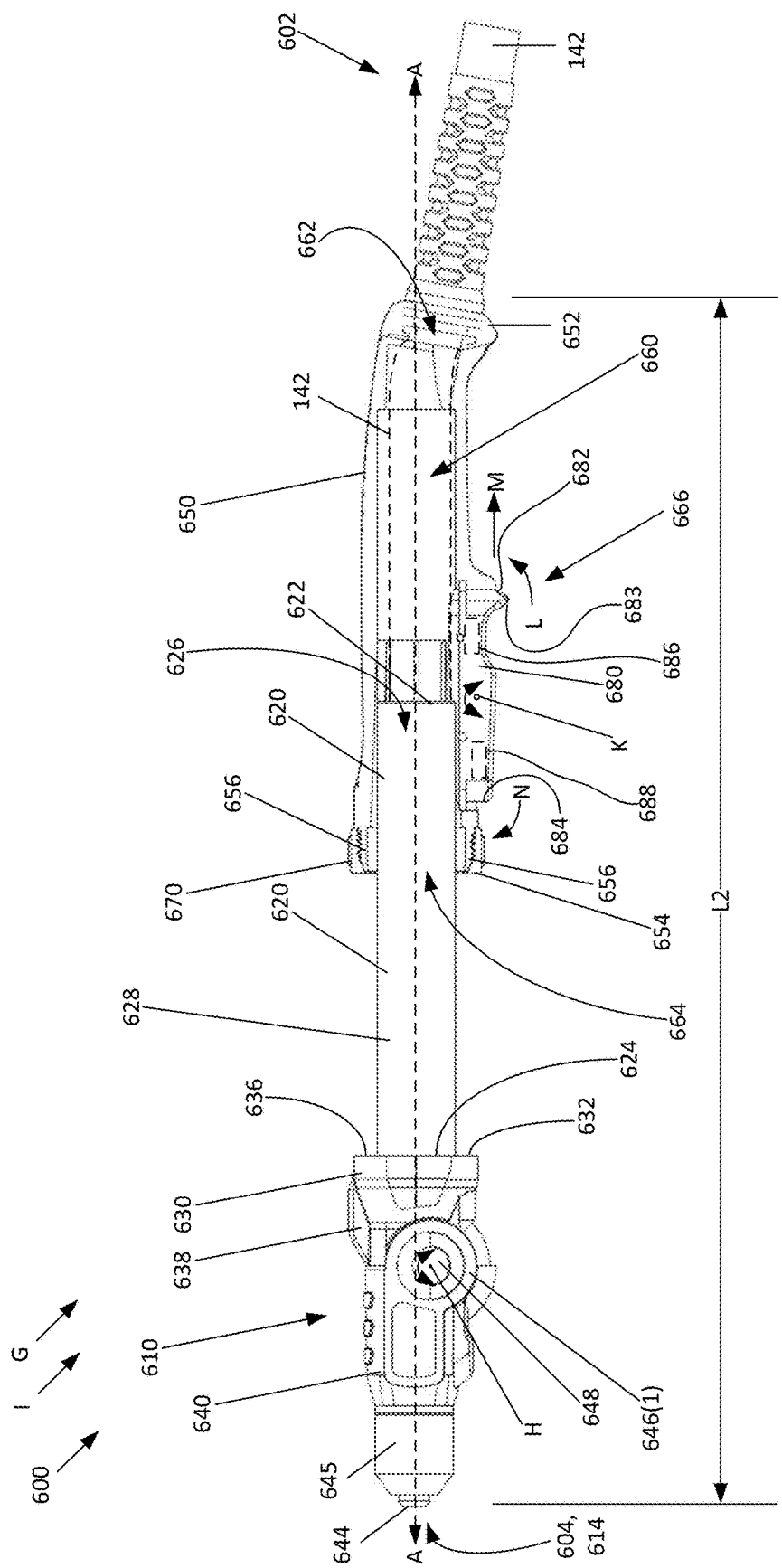
FIG. 12B is a cross-sectional view of the adjustable torch illustrated in FIG. 8A, where the adjustable torch is in the fully expanded configuration and the torch head portion is in the aligned configuration.

As previously stated, the torch head housing 610 may be configured to telescope, or axially extend/contract, with respect to the torch handle housing 650 in order to change/alter the length of the torch 600. FIGS. 8A, 8B, and 12A illustrate the torch 600 in the fully collapsed configuration F, while FIGS. 11 and 12B illustrate the torch 600 in the fully expanded configuration G. As best illustrated in FIGS. 8A, 8B, and 12A, the neck portion 620 may be slidably disposed within the interior cavity 660 of the torch handle housing 650 by being inserted through the annular tabs 656 (e.g., such that the annular tabs 656 surround the neck portion 620) and the second end 654 of the torch handle housing 650. More specifically, at least the first end 622 of the neck portion 620 is disposed within the interior cavity 660. When the torch 600 is in the fully collapsed configuration F, which is illustrated in FIGS. 8A, 8B, and 12A, the first end 622 of the neck portion 620 of the torch head housing 610 is disposed within the interior cavity 660 more proximate to the first end 652 of the torch handle housing 650 than the second end 654 of the torch handle housing 650. Furthermore, the flange 636 of the intermediate portion 630 of the torch head housing 610 may be disposed against, or proximate to, the lock ring 670 and the annular tabs 656 of the second end 654 of the torch handle housing 650. The abutment of the flange 636 of the intermediate portion 630 of the torch head housing 610 against the lock ring 670 prevents the torch head housing 610 from sliding even further into the interior cavity 660 of the torch handle housing 650. When the torch 600 is in the fully expanded configuration G, which is illustrated in FIGS. 11 and 12B, the first end 622 of the neck portion 620 of the torch head housing 610 may be disposed more proximate to the second end 654 of the torch handle housing 650 than the first end 652 of the torch handle housing 650. In this configuration G, or any configuration between the fully expanded configuration G and the fully collapsed position F, at least a portion of the neck portion 620 may be exposed (i.e., due to the spacing between the flange 636 and the lock ring 670 in these positions). The torch 600 may be reconfigured to an infinite number of configurations between the fully collapsed position F and the fully expanded configuration G.

With continued reference to FIGS. 12A and 12B, the torch lead or cable hose 142 may be directly coupled to the first end 622 of the neck portion 620 within the interior cavity 660 of the torch handle housing 650 such that the torch lead 142 extends out of the first opening 662 disposed at the first end 652 of the torch handle housing 650. With the torch lead 142 coupled to the first end 622 of the neck portion 620, as the torch 600 is expanded in length from the fully collapsed configuration F, the torch handle housing 650 slides along a portion of the torch lead 142. Furthermore, the distance between the connection of the torch lead 142 to the torch 600 and the second end 614 of the torch head housing 610 remains the same regardless of the length configuration in which the torch 600 placed. Thus, as the torch 600 is expanded from the fully collapsed configuration F to the fully expanded configuration G, portions of the torch lead 142 are pulled into the interior cavity 660 of the torch handle housing 650 (i.e., a larger portion of the torch lead 142 is disposed within the interior cavity 660 in the fully expanded configuration G than the fully collapsed configuration F).

Once the torch 600 has been reconfigured to the desired length, a user of the torch 600 may rotate the lock ring 670 in a first direction to tighten the annular tabs 656 (i.e., apply pressure or impart a clamping force) onto the exterior surface 628 of the neck portion 620 to lock or secure the position of the torch head housing 610 with respect to the torch handle housing 650. When the user desires to reconfigure the length of the torch 600, the user may rotate the lock ring 670 in the second direction to reduce the amount of pressure (i.e., reduce the clamping force) that the annular tabs 656 impart onto the exterior surface 628 of the neck portion 620 of the torch head housing 610. In some instances, it may be possible for the user to tighten the lock ring 670 such that enough pressure is applied to the exterior surface 628 of the neck portion 620 of the torch head housing 610 by the annular tabs 656 that the torch head housing 610 is secured with respect to the torch handle housing 650 during normal operations (e.g., plasma cutting) of the torch 600, but that still permits a user to manually adjust the positioning of the torch head housing 610 with respect to the torch handle housing 650. For example, the user may be able to apply enough of a pull force, push force, or rotational force to overcome the pressure or clamping force applied to the neck portion 620 of the torch head housing 610 by the annular tabs 656 of the torch handle housing 650 in order to adjust the positioning of the torch head housing 610 with respect to the torch handle housing 650. In other instances, the user may be able to tighten the lock ring 670 enough to fully lock the position of the torch head housing 610 with respect to the torch handle housing 650 (i.e., place the torch 600 in a fully "rigid" orientation) such that the torch head housing 610 and the torch handle housing 650 may not be subjected to any manual reconfigurations without loosening the lock ring 670.

Returning to FIGS. 8A, 8B, 9A, and 9B, the torch head portion 640 of the torch head housing 610 is illustrated in the aligned configuration I. When in the aligned configuration, the torch head portion 640 extends from the second end 634 of the intermediate portion 630 of the torch head housing 610 along the central longitudinal axis A of the torch 600 (i.e., the tip of the consumable assembly 645 may be parallel or coaxial to the central longitudinal axis A). Thus, as best illustrated in FIGS. 9A and 9B, the central longitudinal axis A may extend through the first end 642 and the second end 644 of the torch head portion 640 when the torch head portion 640 is in the aligned configuration I. As previously mentioned, however, the torch head portion 640 may be configured to pivot about transverse axis H between the aligned configuration I, and an offset configuration J, which is illustrated in FIGS. 13A, 13B, and 14. As previously explained, the transverse axis H may be oriented transverse, or substantially perpendicular, to the central longitudinal axis A, and may extend through the flanges 646(1), 646(2) of the first end 642 of the torch head portion 640, as well as the second end 634 of the intermediate portion 630. When in the offset configuration J, the torch head portion 640 may be offset from the central longitudinal axis A such that the second end 644 of the torch head portion 640 (i.e., the tip of the consumable assembly 645) is no longer aligned with the central longitudinal axis A (i.e., the central longitudinal axis A does not extend through the second end 644 of the torch head portion 640 when in the offset configuration J) or the torch head portion 640 is not oriented parallel to the central longitudinal axis A. In some embodiments, the torch head portion 640 may be pivoted approximately 90 degrees about transverse axis H when being reconfigured between the aligned configuration I and the offset configuration J (i.e., when in the offset configuration J, the tip of the consumable assembly 645 may be oriented perpendicular to the central longitudinal axis A). In other embodiments, the torch head portion 640 may be pivoted more or less than 90 degrees about transverse axis H when being reconfigured between the aligned configuration I and the offset configuration J. While FIGS. 8A, 8B, 9A, and 9B illustrate the torch head portion 640 in the aligned configuration I, and while FIGS. 13A, 13B, and 14 illustrate the torch head portion 640 in the offset configuration J, the torch head portion 640 may be capable of pivoting about transverse axis H to any number of positions or configurations between the aligned configuration I and the offset configuration J. In even further embodiments, the torch head portion 640 and/or the intermediate portion 630 may be equipped with indexing geometry that enables the torch head portion 640 to be pivoted to preselected/predetermined angular positions.

The pivot lock 648 may serve to lock the torch head portion 640 into a pivoted position/configuration (i.e., aligned configuration I, offset configuration J, or any position/configuration therebetween), as well as enable the torch head portion 640 to be pivoted about transverse axis H. In the embodiment illustrated, the pivot lock 648 may include a D-ring that may be utilized by a user to loosen the pivot lock 648, and enable the torch head portion 640 to be pivoted about the transverse axis H. Once the torch head portion 640 has been pivoted to a desired position/configuration (i.e., aligned configuration I, offset configuration J, or any position/configuration therebetween), the user may operate the D-ring of the pivot lock 648 to tighten the pivot lock 648 and secure/lock the torch head portion 640 in the desired position/configuration.

Users may utilize the pivot lock 648 and the torch head portion 640 to pivot the torch head portion 640 to a desired angle with respect to the intermediate portion 630 and the torch handle housing 650. In some instances, however, a user may pivot the torch head portion 640 to the offset configuration J when the user desires to utilize the projection 638 of the intermediate portion 630 of the torch head housing 610 as an impact surface (e.g., as a hammer). Pivoting the torch head portion 640 to the offset configuration J results in the tip of the consumable assembly 645 being pivoted away from the projection 638. Thus, when pivoted to the offset configuration J, the tip of the consumable assembly 645 is safely disposed away from the projection 638 of the intermediate portion 630 of the torch head housing 610, enabling the projection 638 to be utilized by a user to strike objects and/or a work surface without the possibility of damaging the consumable assembly 645.

Figure 15A:
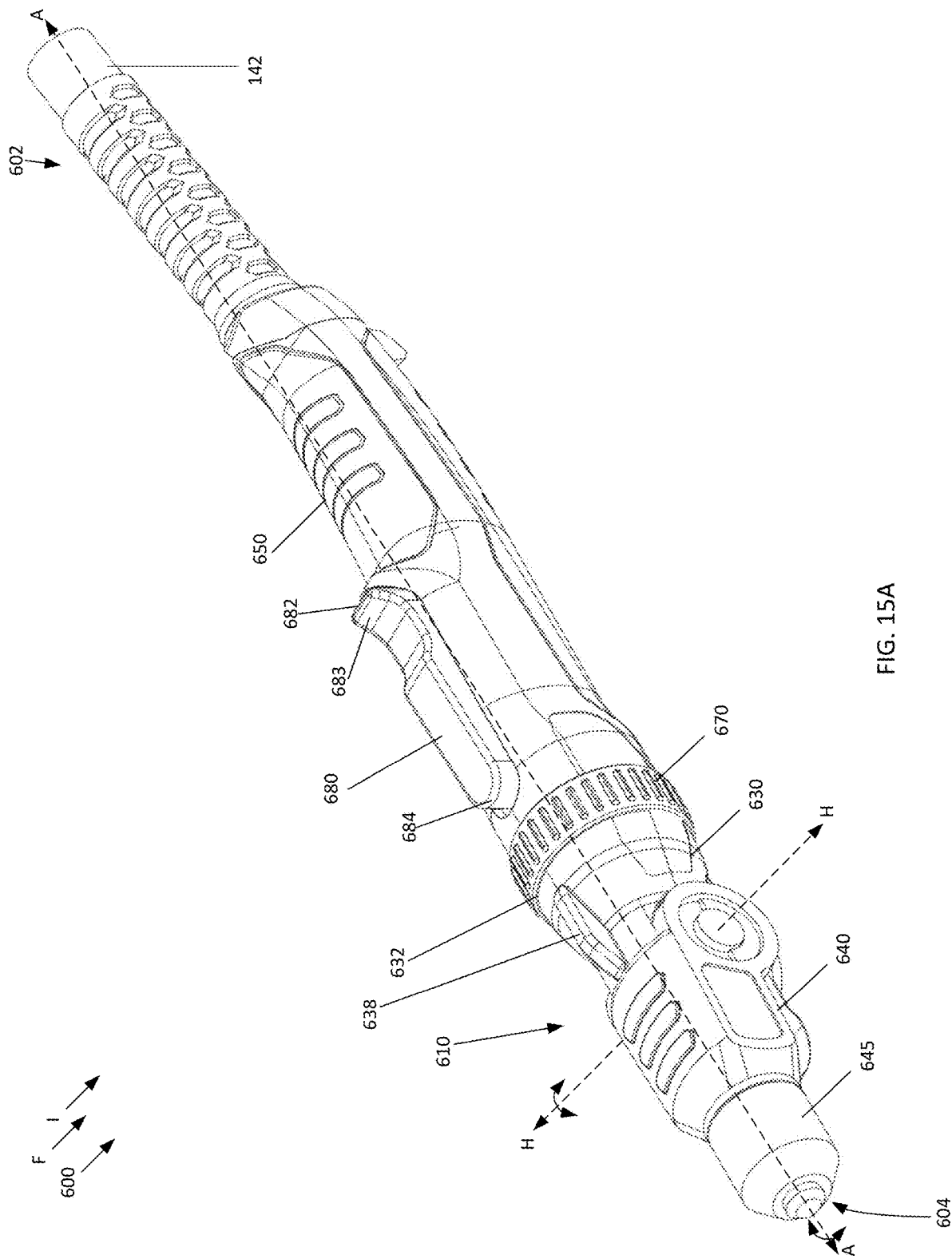
FIG. 15A is a perspective view of the embodiment of the adjustable torch illustrated in FIG. 8A, where the adjustable torch is in the fully collapsed configuration, the torch head portion is in the aligned configuration, and the torch head housing has been rotated approximately 180 degrees with respect to the torch handle housing.
Figure 15B:
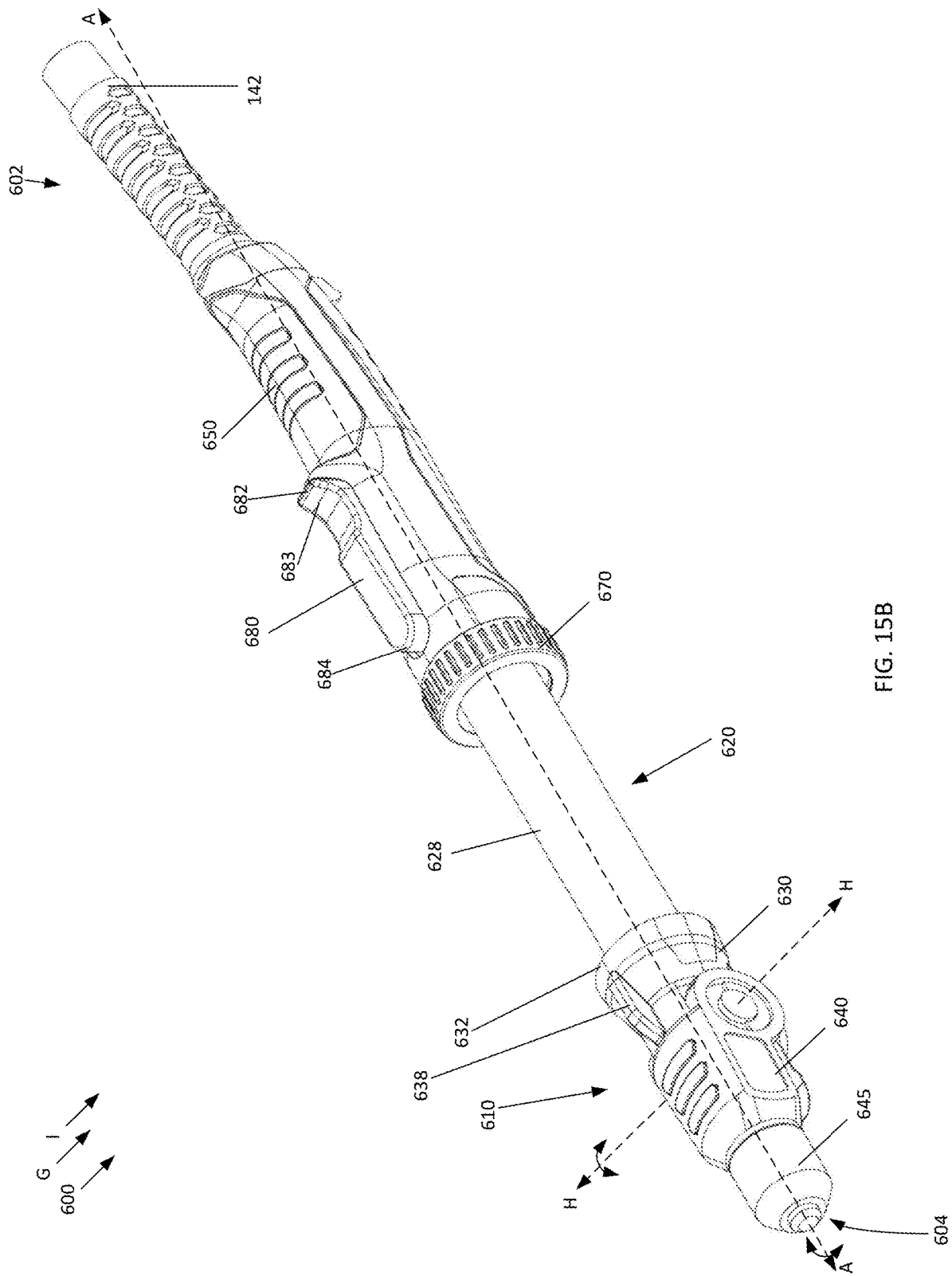
FIG. 15B is a perspective view of the embodiment of the adjustable torch illustrated in FIG. 8A, where the adjustable torch is in the fully collapsed configuration, the torch head portion is in the offset configuration, and the torch head housing has been rotated approximately 180 degrees with respect to the torch handle housing.
Figure 15C:
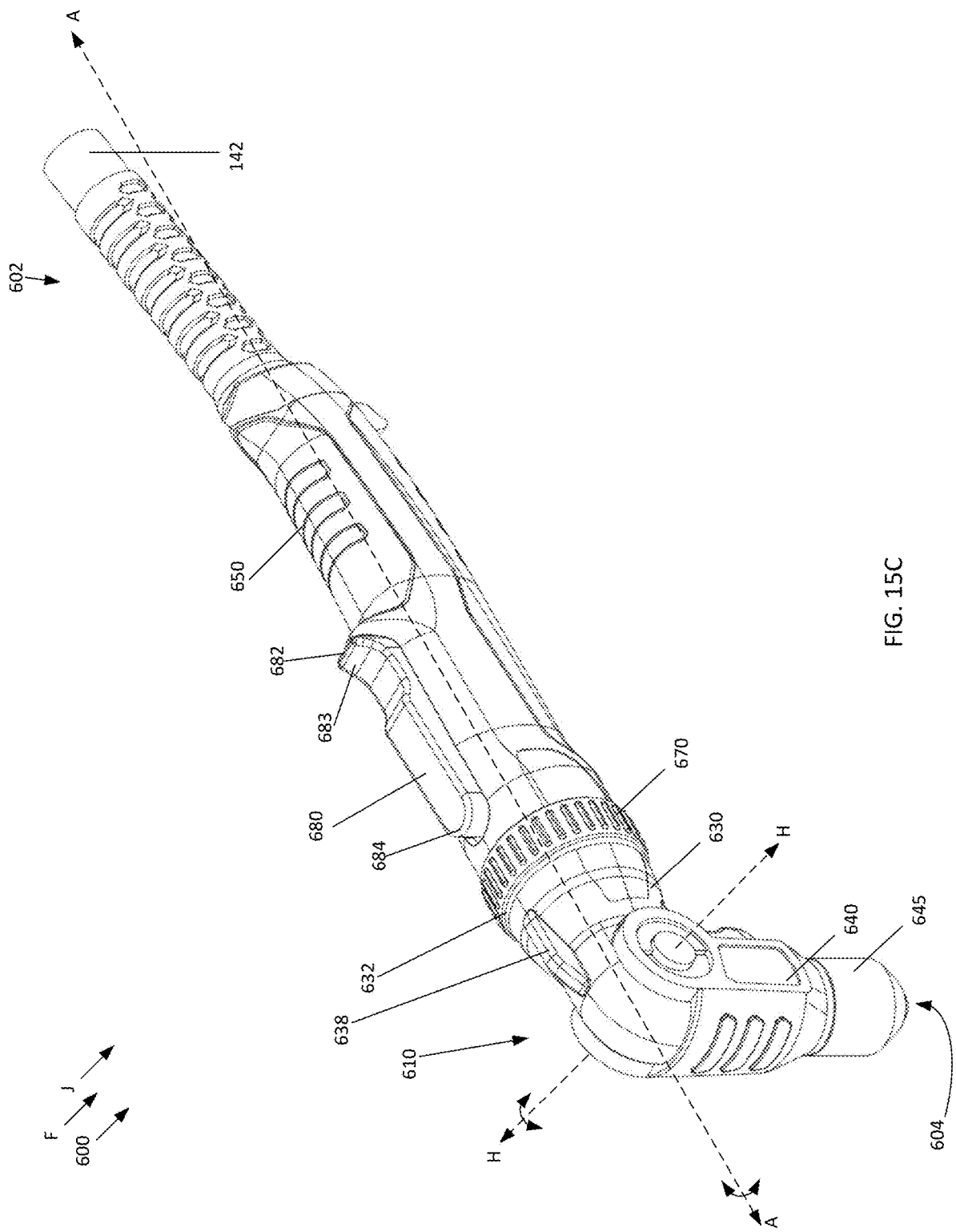
FIG. 15C is a perspective view of the embodiment of the adjustable torch illustrated in FIG. 8A, where the adjustable torch is in the fully expanded configuration, the torch head portion is in the aligned configuration, and the torch head housing has been rotated approximately 180 degrees with respect to the torch handle housing.
Figure 15D:
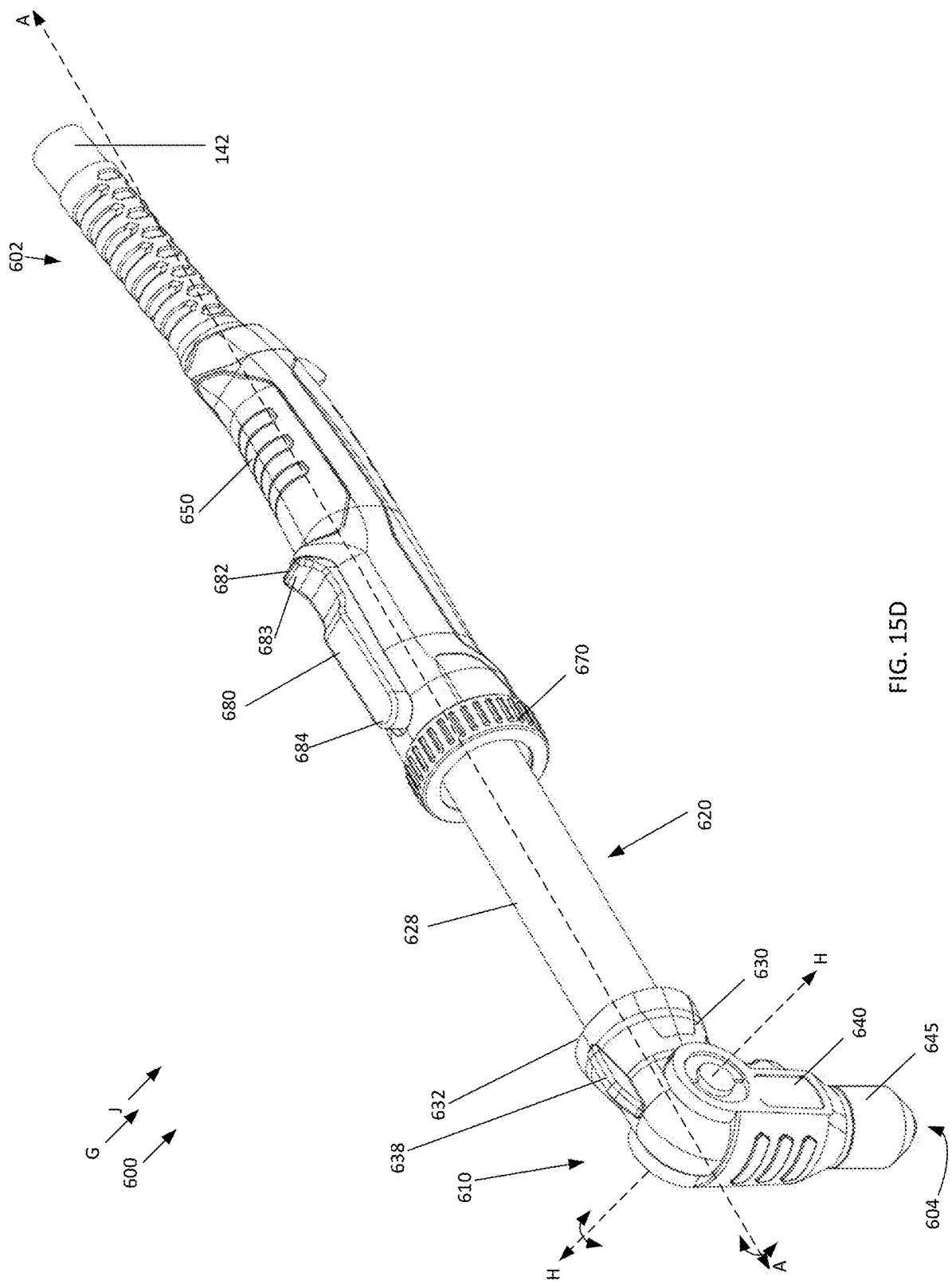
FIG. 15D is a perspective view of the embodiment of the adjustable torch illustrated in FIG. 8A, where the adjustable torch is in the fully expanded configuration, the torch head portion is in the offset configuration, and the torch head housing has been rotated approximately 180 degrees with respect to the torch handle housing.

As explained previously, the torch 600 may further be capable of another degree of adjustment, or another degree of movement, where the torch head housing 610 is capable of being rotated about central longitudinal axis A with respect to the torch handle housing 650. As illustrated in FIGS. 8A, 8B, 11, 12A, 12B, 13A, 13B, and 14, the torch head housing 610 is in an initial position, in which the torch head housing 610 is rotated 0 degrees with respect to the torch handle housing 650. Because the neck portion 620 of the torch head housing 610 and the interior cavity 660 of the torch handle housing 650 are cylindrical (i.e., have at least a generally circular cross-section), the torch head housing 610 may be configured to axially rotate 360 degrees with respect to the torch handle housing 650, or vice versa. This axial rotation is further facilitated by the torch leach 142 being directly coupled to the first end 622 of the neck portion 620 of the torch head housing 610 rather than the first end 652 of the torch handle housing 650. FIGS. 15A-15D illustrate the torch head housing 610 axially rotated 180 degrees about central longitudinal axis A with respect to the torch handle housing 650. FIGS. 15A-15D further illustrate that the torch head housing 610 may be axially rotated about central longitudinal axis A with respect to the torch handle housing 650 regardless of whether the torch 600 is in the fully collapsed configuration F, fully expanded configuration G, or some other expanded configuration therebetween. In addition, FIGS. 15A-15D also illustrate that the torch head housing 610 may be axially rotated about central longitudinal axis A with respect to the torch handle housing 650 regardless of whether the torch head portion 640 of the torch head housing 610 is in the aligned configuration I, offset configuration J, or some other pivoted configuration/position therebetween. As best illustrated in FIGS. 15B and 15D, when the torch head portion 640 of the torch head housing 610 is in the offset configuration J, and the torch head housing 610 is rotated 180 degrees with respect to the torch handle housing 650, the tip of the consumable assembly 645 may be pointed/directed in a direction that is opposite of that of the trigger 680. This orientation of the components of the torch 600 may enable the user to operate the trigger 680 with their thumb rather than their fingers. Axial rotation of the torch head housing 610 with respect to the torch handle housing 650 may enable a user to position the trigger 680 in a desired position with respect to the consumable assembly 645 attached to the torch head housing 610.

The rotation of the torch head housing 610 with respect to torch handle housing 650 may be facilitated by rotation of the lock ring 670 in a manner similar to that described above with respect to adjustment of the length (i.e., reconfiguring the torch 600 between the fully collapsed configuration F and fully expanded configuration G, or to any configuration/position therebetween). In other words, as previously explained, rotation of the lock ring 670 about the central axis A in the first direction tightens the lock ring 670 onto the annular tabs 656, which causes the annular tabs 656 to converge axially toward one another and toward the exterior surface 628 of the neck portion 620 of the torch head housing 610 in order to apply a clamping force onto the outer surface 628 of the neck portion 620. The clamping force applied by the annular tabs 656 may not only lock the torch head housing 610 in a specific length position with respect to the torch handle housing 650, but may also serve to lock the torch head housing 610 in a specific rotational angle with respect to the torch handle housing 650. In order to adjust the length and/or rotational position of the torch head housing 610 with respect to torch handle housing 650, the lock ring 670 may be rotated about the central axis A in the second direction to loosen the lock ring 670 around the annular tabs 656, which reduces the clamping force applied by the annular tabs 656 to the exterior surface 628 of the neck portion 620.

Returning to FIGS. 8A, 8B, 12A, and 12B, and as previously explained, the trigger 680 may be capable of different actuation operations/movements that are configured to facilitate different operations of the torch 600. The trigger 680 of the torch 600 may be an elongated structure with a first end 682 and an opposite second end 684. The first end 682 may be further equipped with a depression or curved extension 683 that is configured to receive at least one finger of a user's hand. As best illustrated in FIGS. 12A and 12B, disposed within the trigger 680 is a first actuator 686 and a second actuator 688. The first actuator 686 may be disposed more proximate to the first end 682 than the second end 684 of the trigger 680, while the second actuator 688 may be disposed more proximate to the second end 684 than the first end 682 of the trigger 680. In a first actuation operation, the first end 682 of the trigger 680 may be pivoted about axis G (which is transverse to the torch 600 and the central longitudinal axis A) in pivot direction L, and then slide rearwardly with respect to the torch 600 along plane I. This first dual action operation may be utilized to actuate the first actuator 686, which results in the torch 600 performing a plasma cutting operation. In a second actuation operation, the second end 684 of the trigger 680 may be pivoted about axis K in a pivot direction N. Pivot direction N may be opposite of that of pivot direction L. When the trigger 680 is pivoted about axis K in pivot direction N, the second actuator 688 may be actuated, which causes the visual output device 649 to output a visual output (e.g., the LED to produce a visual light). In some embodiments, actuation of the second actuator 688 may toggle the visual output device 649 between an "on" status (i.e., generating/outputting a visual output) and an "off" status (i.e., not generating/outputting a visual output).

With the embodiment of the torch 600 described and illustrated herein, users may utilize the lock ring 670 and/or the pivot lock 648 to adjust the torch 600. More specifically, users may utilize the pivot lock 648 of the torch head portion 640 to pivot the torch head portion 640 to a desired angle with respect to the intermediate portion 630 and the torch handle housing 650. Users may also utilize, separately or in conjunction with the pivot lock 648, the lock ring 670 to adjust the length of the torch 600 and/or the rotational orientation of the torch head housing 610 (and subsequently the torch head portion 640) with respect to the torch handle housing 650. These adjustable aspects/features of the torch 600 enable a user to utilize a single plasma arc torch 600 for a variety of different plasma cutting operations. These adjustable aspects/feature also enable multiple users to utilize the single plasma arc torch 600, as each user can adjust/set the torch length, pivot offset angle of the torch head portion 640 with respect to the torch handle housing 650, and/or rotational angle of the torch head portion 640 with respect to the torch handle housing 650 to their desired settings.

While the torches presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the torches presented herein may be modified to connect to, or be used with, any desired consumable or non-consumable components, as well as any desired torch lead or cable hose. Additionally, the torches presented herein may be suitable for any type of welding and/or cutting operations, including automated (e.g., mechanized) and/or manual (e.g., handheld) operations.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the torches described herein, or portions thereof may be fabricated from any suitable material or combination of materials, such as plastic or metals (e.g., copper, bronze, hafnium, etc.), as well as derivatives thereof, and combinations thereof.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. A plasma arc torch, comprising:
   a first torch housing portion including a torch handle and a cylindrical interior surface; and
   a second torch housing portion including a neck segment with a cylindrical exterior surface that is movably coupled to the first torch housing portion, wherein, in a first movement, the cylindrical exterior surface of the neck segment is configured to slide along the cylindrical interior surface of the first torch housing portion to move the second torch housing portion along a longitudinal axis of the plasma arc torch and adjust a length of the plasma arc torch, and in a second movement, the cylindrical exterior surface of the neck segment is configured to rotate about the longitudinal axis of the plasma arc torch on the cylindrical interior surface of the first torch housing portion to rotate the second torch housing portion with respect to the torch handle of the first torch housing portion.

2. The plasma arc torch according to claim 1, wherein the second torch housing portion further comprises a torch head segment.

3. The plasma arc torch according to claim 2, wherein the torch head segment is coupled to a distal end of the neck segment and is configured to removably receive a consumable assembly.

4. The plasma arc torch according to claim 1, wherein an end of the first torch housing portion includes a series of annular tabs that surround at least a portion of the cylindrical exterior surface of the neck segment.

5. The plasma arc torch according to claim 4, wherein a lock ring is threaded onto the series of annular tabs and configured to cause the series of annular tabs to impart a clamping force onto the cylindrical exterior surface of the neck segment based on rotation of the lock ring with respect to the series of annular tabs.

6. The plasma arc torch according to claim 1, wherein a torch lead is coupled to the neck segment of the second torch housing portion and at least partially disposed within an interior cavity of the first torch housing portion such that, as the length of the plasma arc torch is increased, the first torch housing portion slides along the torch lead.

7. The plasma arc torch according to claim 1, wherein in a third movement, at least a segment of the second torch housing portion is configured to rotate about a transverse axis of the plasma arc torch with respect to the first torch housing portion, the transverse axis being transverse to the longitudinal axis.

8. The plasma arc torch according to claim 7, wherein the second torch housing portion further comprises an intermediate segment and a torch head segment.

9. The plasma arc torch according to claim 8, wherein the intermediate segment includes a projection configured to be used as an impact device for striking objects or a work surface.

10. The plasma arc torch according to claim 9, wherein the torch head segment is configured to rotate about the transverse axis between an aligned position, where the torch head segment extends from the intermediate segment along the longitudinal axis of the plasma arc torch, and an offset position, where the torch head segment is offset from the longitudinal axis of the plasma arc torch and a consumable assembly coupled to the torch head segment is rotated away from the projection of the intermediate segment.

11. The plasma arc torch according to claim 9, wherein the torch head segment is configured to rotate about the transverse axis towards a first side of the intermediate segment and the projection is disposed on a second side of the intermediate segment, opposite the first side of the intermediate segment so that the projection remains accessible when the torch head segment is repositioned with respect to the intermediate segment.

12. The plasma arc torch according to claim 8, wherein the torch head segment is coupled to a distal end of the intermediate segment and is configured to removably receive a consumable assembly.

13. A plasma arc torch, comprising:
    a first torch housing portion; and
    a second torch housing portion including a neck segment, an intermediate segment, and a torch head segment, the neck segment being movably coupled to the first torch housing portion, wherein, in a first movement, the second torch housing portion is configured to slide along a longitudinal axis of the plasma arc torch to adjust a length of the plasma arc torch, and in a second movement, at least the torch head segment of the second torch housing portion is configured to rotate about a transverse axis of the plasma arc torch with respect to the first torch housing portion, the transverse axis being transverse to the longitudinal axis,
    wherein the intermediate segment includes a projection configured to be used as an impact device for striking objects or a work surface, the torch head segment is configured to rotate about the transverse axis towards a first side of the intermediate segment, and the projection is disposed on a second side of the intermediate segment, opposite the first side of the intermediate segment so that the projection remains accessible when the torch head segment is repositioned with respect to the intermediate segment.

14. The plasma arc torch according to claim 13, wherein the neck segment is at least partially disposed within an interior cavity of the first torch housing portion.

15. The plasma arc torch according to claim 14, wherein an end of the first torch housing portion includes a series of annular tabs that surround at least a portion of an exterior surface of the neck segment.

16. The plasma arc torch according to claim 15, wherein a lock ring is threaded onto the series of annular tabs and configured to cause the series of annular tabs to impart a clamping force onto the exterior surface of the neck segment based on rotation of the lock ring with respect to the series of annular tabs.

17. The plasma arc torch according to claim 13, wherein the torch head segment is configured to removably receive a consumable assembly.

18. The plasma arc torch according to claim 13, wherein the torch head segment is configured to rotate about the transverse axis between an aligned position where the torch head segment extends from the intermediate segment along the longitudinal axis of the plasma arc torch, and an offset position where the torch head segment is offset from the longitudinal axis of the plasma arc torch and a consumable assembly coupled to the torch head segment is rotated away from the projection of the intermediate segment.

19. The plasma arc torch according to claim 13, wherein a torch lead is coupled to the neck segment of the second torch housing portion and at least partially disposed within an interior cavity of the first torch housing portion such that, as the length of the plasma arc torch is increased, the first torch housing portion slides along the torch lead.

20. The plasma arc torch according to claim 13, wherein, in a third movement, the second torch housing portion is configured to rotate about the longitudinal axis of the plasma arc torch with respect to a torch handle of the first torch housing portion.

* * * * *